(12) United States Patent
Harel et al.

(10) Patent No.: US 9,924,308 B2
(45) Date of Patent: Mar. 20, 2018

(54) DETERMINING LOCATION OF CLIENT DEVICES IN A DISTRIBUTED ANTENNA SYSTEM (DAS) BASED ON DETECTING RECEIVED UPLINK POWER

(71) Applicant: Corning Optical Communications Wireless Ltd., Airport (IL)

(72) Inventors: Dror Harel, Hod Hasharon (IL); Parwiz Shekalim, Netanya (IL)

(73) Assignee: Corning Optical Communications Wireless Ltd, Airport (IL)

( * ) Notice: Subject to any disclaimer, the term of this patent is extended or adjusted under 35 U.S.C. 154(b) by 0 days.

(21) Appl. No.: 15/617,237

(22) Filed: Jun. 8, 2017

(65) Prior Publication Data

US 2017/0272903 A1    Sep. 21, 2017

Related U.S. Application Data

(63) Continuation of application No. 14/984,014, filed on Dec. 30, 2015, now Pat. No. 9,730,011.

(Continued)

(51) Int. Cl.
| | |
|---|---|
| *H04W 64/00* | (2009.01) |
| *H04W 4/02* | (2018.01) |
| *H04W 24/02* | (2009.01) |
| *H04W 52/04* | (2009.01) |
| *H04W 52/28* | (2009.01) |

(Continued)

(52) U.S. Cl.
CPC ............ *H04W 4/02* (2013.01); *H04L 5/0048* (2013.01); *H04W 24/02* (2013.01); *H04W 24/10* (2013.01); *H04W 52/04* (2013.01); *H04W 52/146* (2013.01); *H04W 52/283* (2013.01)

(58) Field of Classification Search
CPC ....... H04W 4/02; H04W 24/02; H04W 24/10; H04W 52/04; H04W 72/0406; H04W 72/0473; H04L 5/0048
USPC ........... 455/404.1, 404.2, 450, 456.1–2, 561, 455/562.1
See application file for complete search history.

(56) References Cited

U.S. PATENT DOCUMENTS

| | | | | |
|---|---|---|---|---|
| 5,034,622 A | * | 7/1991 | Kuzmik | H02H 1/0084 307/149 |
| 8,239,694 B2 | * | 8/2012 | Saha | H02M 3/156 323/283 |

(Continued)

FOREIGN PATENT DOCUMENTS

WO    2012121774 A2    9/2012

*Primary Examiner* — Cong Tran
(74) *Attorney, Agent, or Firm* — C. Keith Montgomery

(57) ABSTRACT

Embodiments of the disclosure relate to determining location of client devices in a distributed antenna system (DAS) based on detecting uplink received power. In this regard, a client device location system is provided in the DAS to configure each remote unit in the DAS to generate a power-regulated UL communications signal based on an assigned power pattern. If a respective power pattern of a reference signal(s) uniquely identifying a client device corresponds to the assigned power pattern of the remote unit that generates the power-regulated UL communications signal, the client device location system reports the location of the remote unit as the location of the client device in the DAS. Hence, it is possible to locate the client device based on the location of the remote unit, thus providing the location of the client device with higher degree of accuracy.

20 Claims, 12 Drawing Sheets

Related U.S. Application Data

(60) Provisional application No. 62/253,326, filed on Nov. 10, 2015.

(51) Int. Cl.
*H04W 24/10* (2009.01)
*H04W 52/14* (2009.01)
*H04L 5/00* (2006.01)

(56) References Cited

U.S. PATENT DOCUMENTS

| | | | |
|---|---|---|---|
| 2006/0189288 A1* | 8/2006 | Jin | H03G 3/3052 455/232.1 |
| 2008/0232328 A1 | 9/2008 | Scheinert et al. | |
| 2011/0105184 A1 | 5/2011 | Piirainen et al. | |
| 2012/0322397 A1* | 12/2012 | Jin | H03G 3/3052 455/234.2 |
| 2013/0249292 A1 | 9/2013 | Blackwell, Jr. et al. | |
| 2014/0022914 A1 | 1/2014 | Leimeister et al. | |
| 2014/0235173 A1* | 8/2014 | Gupta | H04R 3/04 455/62 |
| 2015/0381289 A1 | 12/2015 | Cox et al. | |
| 2016/0037301 A1 | 2/2016 | Davydov et al. | |
| 2016/0037550 A1 | 2/2016 | Barabell et al. | |
| 2016/0205513 A1 | 7/2016 | Choudhry | |

* cited by examiner

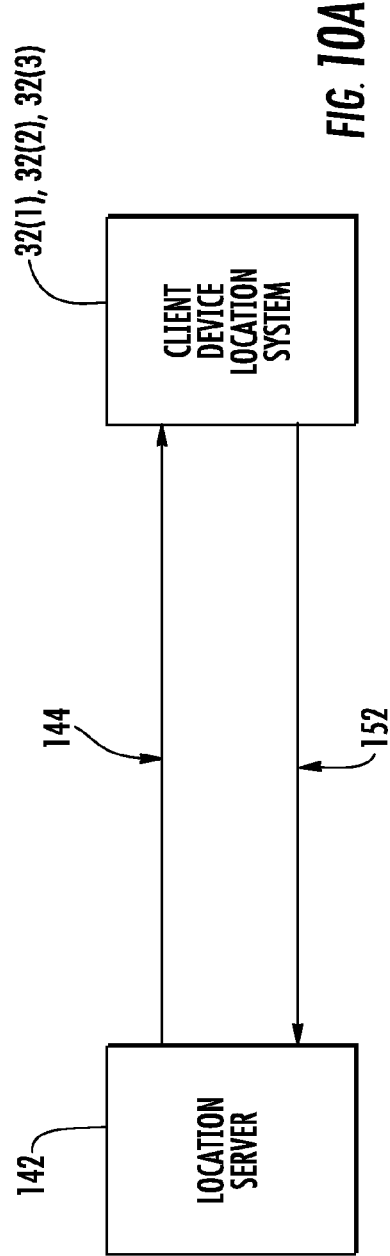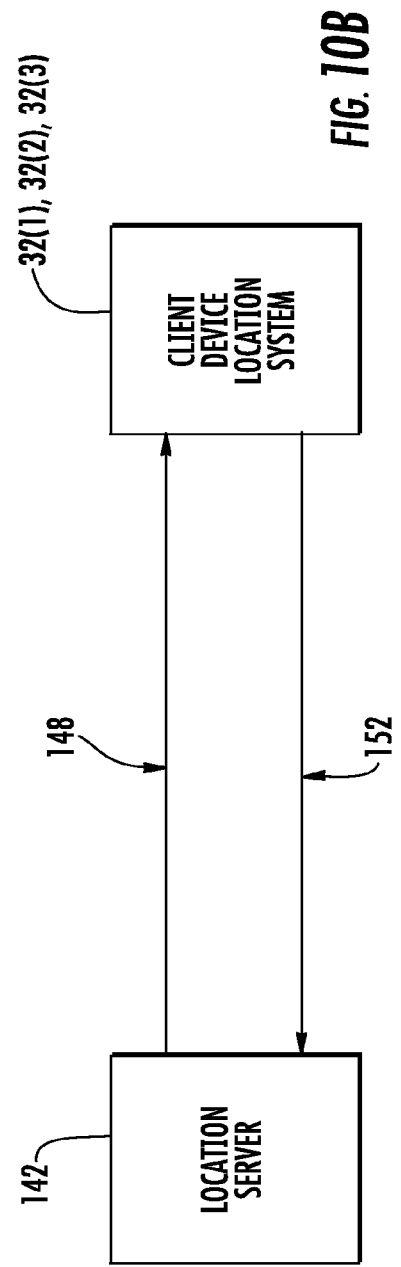

US 9,924,308 B2

DETERMINING LOCATION OF CLIENT DEVICES IN A DISTRIBUTED ANTENNA SYSTEM (DAS) BASED ON DETECTING RECEIVED UPLINK POWER

PRIORITY APPLICATIONS

This application is a continuation of U.S. application Ser. No. 14/984,014, filed Dec. 30, 2015, which claims the benefit of priority under 35 U.S.C. § 119 of U.S. Provisional Application 62/253,326, filed on Nov. 10, 2015, the content of which is relied upon and incorporated herein by reference in its entirety.

BACKGROUND

The disclosure relates generally to a distributed antenna system (DAS) and, more particularly, to locating client devices in a DAS.

Wireless customers are increasingly demanding more sophisticated wireless services, such as context-aware and location-aware wireless services. At the same time, some wireless customers use their wireless communication devices in areas that are poorly serviced by conventional cellular networks, such as inside certain buildings or areas where there is little cellular coverage. One response to the intersection of these two concerns has been the use of DASs. DASs include remote units configured to receive and transmit communications signals to client devices within the antenna range of the remote units. DASs can be particularly useful when deployed inside buildings or other indoor environments where the wireless communication devices may not otherwise be able to effectively receive radio frequency (RF) signals from a source.

Many context-aware and location-aware wireless services, such as enhanced 911 (E911) services, rely on accurately detecting the locations of wireless communication devices. A satellite-based location detection system, such as global positioning system (GPS) in the United States, is unreliable in indoor environments served by the DASs due to the inherent inability of a satellite signal to penetrate obstacles like building walls. Although it may be possible to determine general locations of wireless communication devices based on base stations in the convention cellular network, it remains challenging for base stations to pinpoint the locations of the wireless communication devices with higher degree of accuracy.

No admission is made that any reference cited herein constitutes prior art. Applicant expressly reserves the right to challenge the accuracy and pertinency of any cited documents.

SUMMARY

Embodiments of the disclosure relate to determining location of client devices in a distributed antenna system (DAS) based on detecting uplink received power. In this regard, in aspects disclosed herein, a location of a client device in a DAS can be identified by determining the location of a remote unit with which the client device is engaged in downlink (DL) and/or uplink (UL) communications (e.g., exchange of control messages or traffic). In this regard, in one exemplary aspect, a particular power pattern can be assigned to remote units that receive UL communications signals from client devices in the DAS. A remote unit is configured to generate a power-regulated UL communications signal based on a respective assigned power pattern and respective UL communications signals received from client devices engaged in the UL communications with the remote unit. The power-regulated UL communications signal is analyzed in the DAS to determine if the respective assigned power pattern in the received power-regulated UL communications signal can be associated with a client device to be located. Thus, the location of the client device can be known to be within a communication range of the remote unit that has the respective assigned power pattern. The remote units in the DAS may each be assigned a unique power pattern or share a common power pattern, as examples. When the remote units are sharing the common power pattern, the remote units can be temporally controlled to communicate the power-regulated UL communications signals in the DAS. By determining the location of the client device based on detecting the assigned power pattern associated with the remote unit communicating with the client device, it is possible to determine the relative location of the client device in the DAS based on the location of the remote unit, thus providing the location of the client device with higher degree of accuracy.

One embodiment of the disclosure relates to a client device location identification system for a DAS. The client device location identification system comprises a plurality of remote units in the DAS. Each of the plurality of remote units is configured to receive a UL communications signal from the one or more client devices communicatively coupled to the DAS. Each of the plurality of remote units is also configured to generate a power-regulated UL communications signal based on an assigned power pattern. The power-regulated UL communications signal comprises one or more reference signals uniquely identifying the one or more client devices. The client device location identification system also comprises a client device location system. The client device location system is configured to determine the assigned power pattern for each of the plurality of remote units. The client device location system is also configured to receive the power-regulated UL communications signal from each of the plurality of remote units. The client device location system is also configured to determine a respective reference signal power pattern and a respective client device identification associated with each of the one or more reference signals comprised in the received power-regulated UL communications signal. The client device location system is also configured to determine whether the respective reference signal power pattern corresponds to the assigned power pattern of a remote unit that generates the power-regulated UL communications signal.

Another embodiment of the disclosure relates to a method for locating client devices in a DAS. The method comprises determining an assigned power pattern for each of a plurality of remote units in the DAS. The method also comprises configuring each of the plurality of remote units to generate a power-regulated UL communications signal based on the assigned power pattern. The power-regulated UL communications signal comprises one or more reference signals uniquely identifying one or more client devices. The method also comprises determining a respective reference signal power pattern and a respective client device identification associated with each of the one or more reference signals comprised in the power-regulated UL communications signal. The method also comprises determining whether the respective reference signal power pattern corresponds to the assigned power pattern of a remote unit that generates the power-regulated UL communications signal.

Another embodiment of the disclosure relates to a DAS for locating client devices. The DAS comprises a central unit communicatively coupled to a communications signal source and a plurality of remote units over at least one communications medium. Each of the plurality of remote units is configured to receive a DL communications signal from the central unit over the at least one communications medium. Each of the plurality of remote units is also configured to distribute the DL communications signal to one or more client devices in the DAS. Each of the plurality of remote units is also configured to receive a UL communications signal from the one or more client devices. Each of the plurality of remote units is also configured to generate a power-regulated UL communications signal based on an assigned power pattern. The power-regulated UL communications signal comprises one or more reference signals uniquely identifying the one or more client devices. Each of the plurality of remote units is also configured to provide the power-regulated UL communications signal to the central unit over the at least one communications medium. The DAS also comprises a client device location system communicatively coupled to the central unit and the plurality of remote units. The client device location system is configured to determine the assigned power pattern for each of the plurality of remote units. The client device location system is also configured to receive the power-regulated UL communications signal from each of the plurality of remote units. The client device location system is also configured to determine a respective reference signal power pattern and a respective client device identification associated with each of the one or more reference signals comprised in the received power-regulated UL communications signal. The client device location system is also configured to determine whether the respective reference signal power pattern corresponds to the assigned power pattern of a remote unit that generates the power-regulated UL communications signal. The client device location system is also configured to report a location of the remote unit that generates the power-regulated UL communications signal as a location of a client device having the respective client device identification if the respective reference signal power pattern is determined to correspond to the assigned power pattern of the remote unit that generates the power-regulated UL communications signal.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification.

BRIEF DESCRIPTION OF THE DRAWINGS

FIG. 10A is a schematic diagram providing an exemplary illustration of a location server configured to locate a specified client device(s) associated with a specified reference signal(s);

FIG. 10B is a schematic diagram providing an exemplary illustration of a location server configured to locate a specified client device(s) associated with a specified client device identification(s);

DETAILED DESCRIPTION

Embodiments of the disclosure relate to determining location of client devices in a distributed antenna system (DAS) based on detecting uplink received power. In this regard, in aspects disclosed herein, a location of a client device in a DAS can be identified by determining the location of a remote unit with which the client device is engaged in downlink (DL) and/or uplink (UL) communications. In this regard, in one exemplary aspect, a particular power pattern can be assigned to remote units that receive UL communications signals from client devices in the DAS. A remote unit is configured to generate a power-regulated UL communications signal based on a respective assigned power pattern and respective UL communications signals received from client devices engaged in the UL communications with the remote unit. The power-regulated UL communications signal is analyzed in the DAS to determine if the respective assigned power pattern in the received power-regulated UL communications signal can be associated with a client device to be located. Thus, the location of the client device can be known to be within a communication range of the remote unit that has the respective assigned power pattern. The remote units in the DAS may each be assigned a unique power pattern or share a common power pattern. When the remote units share the common power pattern, the remote units can be temporally controlled to communicate the power-regulated UL communications signals in the DAS. By determining the location of the client device based on detecting the assigned power pattern associated with the remote unit communicating with the client device, it is possible to determine the relative location of the client device in the DAS based on the location of the remote unit, thus providing the location of the client device with higher degree of accuracy.

Figure 1:
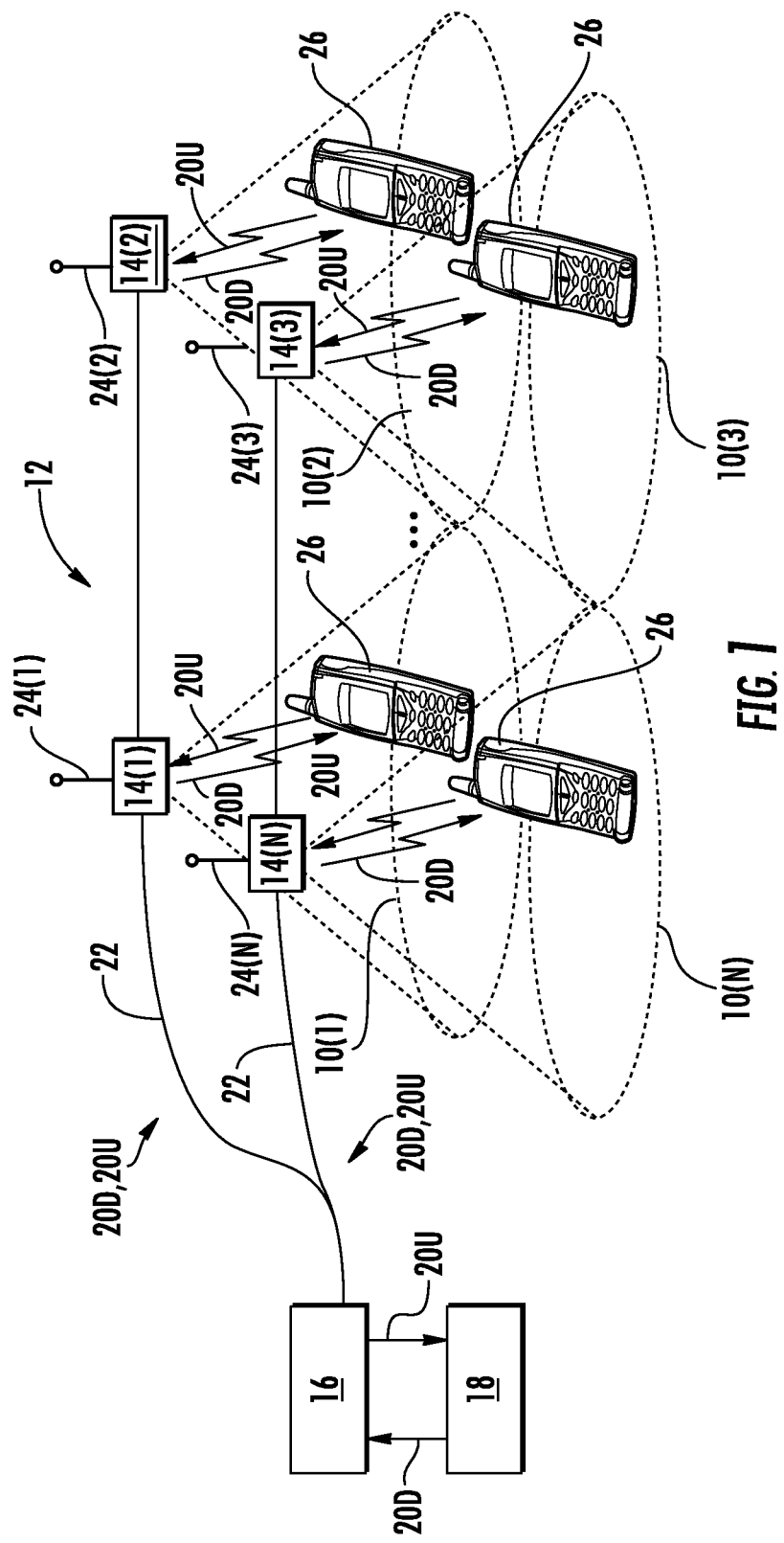
FIG. 1 is a schematic diagram of an exemplary distributed antenna system (DAS)

Before discussing examples of determining the locations of client devices in a DAS, a discussion of an exemplary DAS that employs a communications medium to support wireless communications services to a plurality of remote units is first provided with reference to FIG. 1. The discussion of specific exemplary aspects of determining location of client devices in a DAS starts at FIG. 2.

In this regard, FIG. 1 illustrates distribution of communications services to remote coverage areas 10(1)-10(N) of a DAS 12, wherein 'N' is the number of remote coverage areas. These communications services can include cellular services, wireless services, such as radio frequency identification (RFID) tracking, Wireless Fidelity (Wi-Fi), local area network (LAN), and wireless LAN (WLAN), worldwide interoperability for microwave access (WiMAX), wide-band code-division multiple access (WCDMA), long-term evolution (LTE), and combinations thereof, as examples. The remote coverage areas 10(1)-10(N) may be remotely located. In this regard, the remote coverage areas 10(1)-10(N) are created by and centered on remote units 14(1)-14(N) (e.g., remote antenna units) connected to a central unit 16 (e.g., a head-end controller, a head-end unit, or a head-end equipment). The central unit 16 may be communicatively coupled to a signal source 18, for example, a base transceiver station (BTS) or a baseband unit (BBU). In this regard, the central unit 16 receives downlink communications signals 20D from the signal source 18 to be distributed to the remote units 14(1)-14(N). The remote units 14(1)-14(N) are configured to receive the downlink communications signals 20D from the central unit 16 over a communications medium 22 to be distributed to the respective remote coverage areas 10(1)-10(N) of the remote units 14(1)-14(N). In a non-limiting example, the communications medium 22 may be a wired communications medium, a wireless communications medium, or an optical fiber-based communications medium. Each of the remote units 14(1)-14(N) may include an RF transmitter/receiver (not shown) and a respective antenna 24(1)-24(N) operably connected to the RF transmitter/receiver to wirelessly distribute the communications services to client devices 26 within the respective remote coverage areas 10(1)-10(N). The remote units 14(1)-14(N) are also configured to receive uplink communications signals 20U from the client devices 26 in the respective remote coverage areas 10(1)-10(N) to be distributed to the signal source 18. The size of each of the remote coverage areas 10(1)-10(N) is determined by amount of RF power transmitted by the respective remote units 14(1)-14(N), receiver sensitivity, antenna gain, and RF environment, as well as by RF transmitter/receiver sensitivity of the client devices 26. The client devices 26 usually have a fixed maximum RF receiver sensitivity, so that the above-mentioned properties of the remote units 14(1)-14(N) mainly determine the size of the respective remote coverage areas 10(1)-10(N).

With continuing reference to FIG. 1, each of the client devices 26 typically communicates the uplink communications signals 20U with a remote unit 14 among the remote units 14(1)-14(N). As such, by determining the remote unit 14 that receives the uplink communications signals 20U, a client device 26 that communicates the uplink communications signals 20U to the remote unit 14 can be identified in the DAS 12 based on a location of the remote unit 14.

Figure 2:
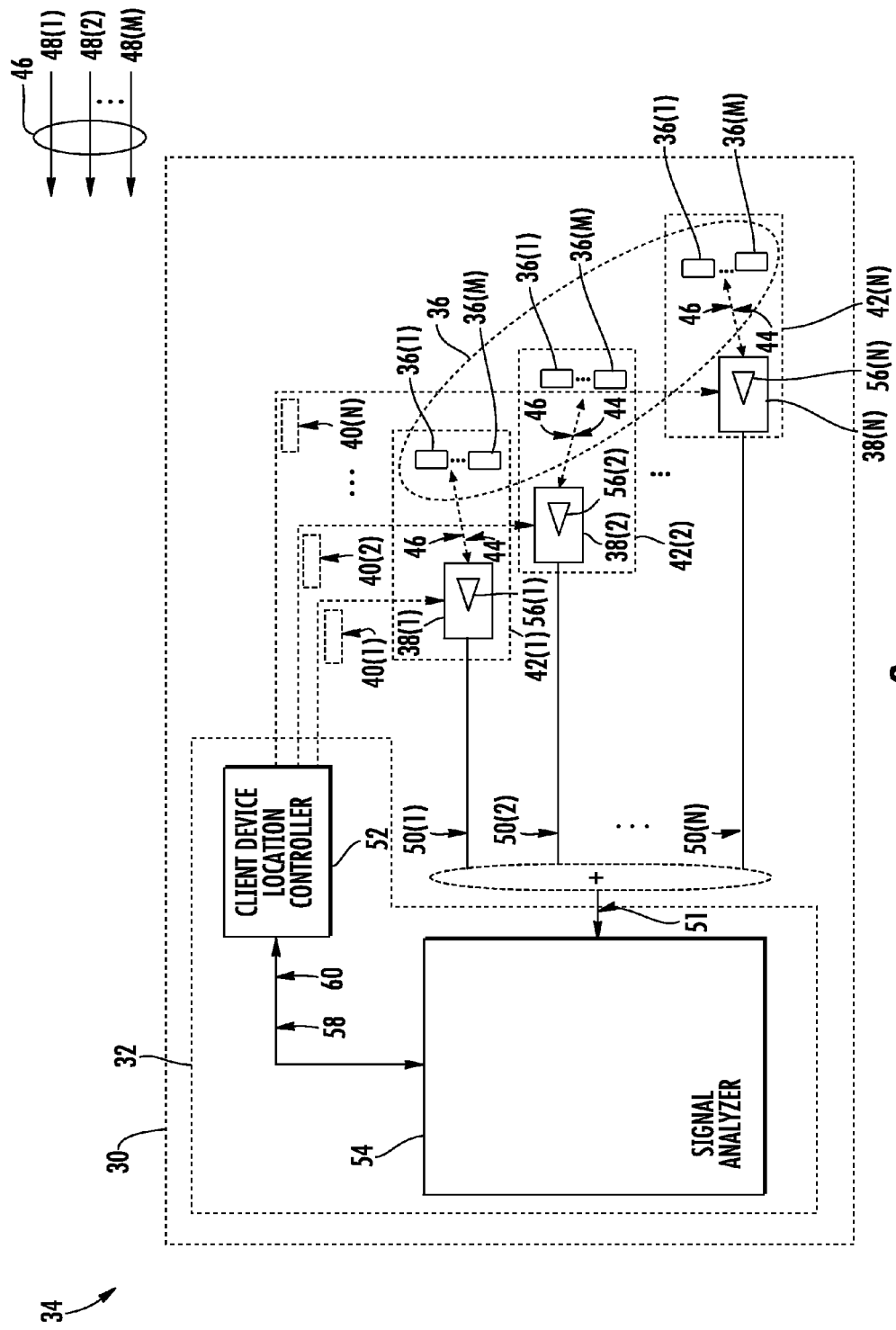
FIG. 2 is a schematic diagram of a client device location identification system that includes a client device location system configured to determine locations of client devices in a DAS based on detecting assigned power patterns associated with a plurality of remote units in the DAS.

In this regard, FIG. 2 is a schematic diagram of an exemplary client device location identification system 30 that includes a client device location system 32 in a DAS 34. The client device location system 32 is configured to determine locations of client devices 36 with respect to locations of a plurality of remote units 38(1)-38(N) based on detecting a plurality of assigned power patterns 40(1)-40(N) associated with the plurality of remote units 38(1)-38(N), respectively. In a non-limiting example, each of the plurality of assigned power patterns 40(1)-40(N) represents a UL variable gain power pattern. In another non-limiting example, an assigned power pattern among the plurality of assigned power patterns 40(1)-40(N) may be assigned to one or more RF channels (not shown) associated with a respective remote unit among the plurality of remote units 38(1)-38(N).

The plurality of remote units 38(1)-38(N), which may be a plurality of remote antenna units (RAUs), is configured to provide communication services in one or more coverage areas 42(1)-42(N), respectively. Each of the one or more coverage areas 42(1)-42(N) includes one or more client devices 36(1)-36(M). In this regard, each of the plurality of remote units 38(1)-38(N) is configured to communicate a respective DL communications signal 44 and a respective UL communications signal 46 with the one or more client devices 36(1)-36(M) in a respective coverage area 42. The respective UL communications signal 46 received by each of the plurality of remote units 38(1)-38(N) includes one or more reference signals 48(1)-48(M) that uniquely identify the one or more client devices 36(1)-36(M) communicating the respective UL communications signal 46. In a non-limiting example, the one or more reference signals 48(1)-48(M) can indicate respective client device identifications of the one or more client devices 36(1)-36(M).

With continuing reference to FIG. 2, in a non-limiting example, each of the plurality of assigned power patterns 40(1)-40(N) is a pulse wave that rises and falls repeatedly according to certain duty cycle. The plurality of remote units 38(1)-38(N) generates a plurality of power-regulated UL communications signals 50(1)-50(N) by increasing and decreasing power amplitude of the respective UL communications signal 46 based on the plurality of assigned power patterns 40(1)-40(N), respectively. Accordingly, each of the plurality of power-regulated UL communications signals 50(1)-50(N) will also include the one or more reference signals 48(1)-48(M) that have respective reference signal power patterns (not shown) corresponding to the assigned power pattern 40. The plurality of power-regulated UL communications signals 50(1)-50(N) may be received as a combined power-regulated UL communications signal 51. The client device location system 32 analyzes each of the plurality of power-regulated UL communications signals 50(1)-50(N) contained in the combined power-regulated UL communications signal 51 to determine if any of the respective reference signal power patterns associated with the power-regulated UL communications signal 50 corresponds to the respective assigned power pattern 40 of the remote unit 38 that generates the power-regulated UL communications signal 50. By establishing a correlation between the respective reference signal power patterns associated with the power-regulated UL communications signal 50 and the one or more reference signals 48(1)-48(M) included in the power-regulated UL communications signal 50, the client device location system 32 is able to determine a location of the client device 36 based on a location of the remote unit 38 that generates the power-regulated UL communications signal 50. Alternatively, the client device location system 32 may also determine the location of the client device 36 based on a predefined location surrounding the location of the remote unit 38 that generates the power-regulated UL communications signal 50.

With continuing reference to FIG. 2, the client device location system 32 includes a client device location controller 52 and a signal analyzer 54. The client device location controller 52 determines the plurality of assigned power patterns 40(1)-40(N) for the plurality of remote units 38(1)-38(N), respectively. The client device location controller 52 also instructs the plurality of remote units 38(1)-38(N) to generate the plurality of power-regulated UL communications signals 50(1)-50(N) based on the plurality of assigned power patterns 40(1)-40(N), respectively. The plurality of remote units 38(1)-38(N) includes a plurality of variable gain power amplifiers 56(1)-56(N) that receives the plurality of assigned power patterns 40(1)-40(N) from the client device location controller 52. The plurality of variable gain power amplifiers 56(1)-56(N) is configured to amplify the UL communications signal 46 received by each of the plurality of remote units 38(1)-38(N) based on the plurality of assigned power patterns 40(1)-40(N), thus generating the plurality of power-regulated UL communications signals 50(1)-50(N), respectively.

With continuing reference to FIG. 2, the signal analyzer 54 is configured to receive the plurality of power-regulated UL communications signals 50(1)-50(N) from the plurality of remote units 38(1)-38(N), respectively. For each power-regulated UL communications signal 50 among the plurality of power-regulated UL communications signals 50(1)-50(N), the signal analyzer 54 is configured to determine a respective reference signal power pattern 58 and a respective client device identification 60 associated with each of the one or more reference signals 48(1)-48(M) included in the power-regulated UL communications signal 50. In a non-limiting example, the signal analyzer 54 subsequently reports the respective reference signal power pattern 58 and the respective client device identification 60 associated with each of the one or more reference signals 48(1)-48(M) in the power-regulated UL communications signals 50 to the client device location controller 52.

In response to receiving the respective reference signal power pattern 58 and the respective client device identification 60 associated with the power-regulated UL communications signals 50, the client device location controller 52 compares the respective reference signal power pattern 58, which is associated with each of the one or more reference signals 48(1)-48(M) included in the power-regulated UL communications signal 50, against the assigned power pattern 40 of the remote unit 38, which may be any of the plurality of remote units 38(1)-38(N), that generates the power-regulated UL communications signal 50. If the respective reference signal power pattern 58 corresponds to the assigned power pattern 40 of the remote unit 38 that generates the power-regulated UL communications signal 50, it is an indication that the client device 36 having the respective client device identification 60 is communicating with the remote unit 38. Therefore, the client device location controller 52 can report the location of the remote unit 38, which generates the power-regulated UL communications signal 50, as a location of the client device 36 having the respective client device identification 60. In this regard, by determining locations of the client device 36 based on the assigned power pattern 40 of the remote unit 38 that generates the power-regulated UL communications signal 50, it is possible to locate the client devices 36 relative to the coverage areas 42(1)-42(N), thus providing more accurate locations to support context-aware and location-aware wireless services in the DAS 34.

In a non-limiting example, the DL communications signal 44 may be a long-term evolution (LTE) DL communications signal and the UL communications signal 46 may be an LTE UL communications signal. In this regard, the plurality of power-regulated UL communications signals 50(1)-50(N) is a plurality of power-regulated LTE UL communications signals. As such, the signal analyzer 54 may determine the respective reference signal power pattern 58 and extract the respective client device identification 60 from one or more LTE Demodulation Reference Signals (DRSs) or one or more LTE Sounding Reference Signals (SRSs) included in each of the plurality of power-regulated LTE UL communications signals.

Figure 3:
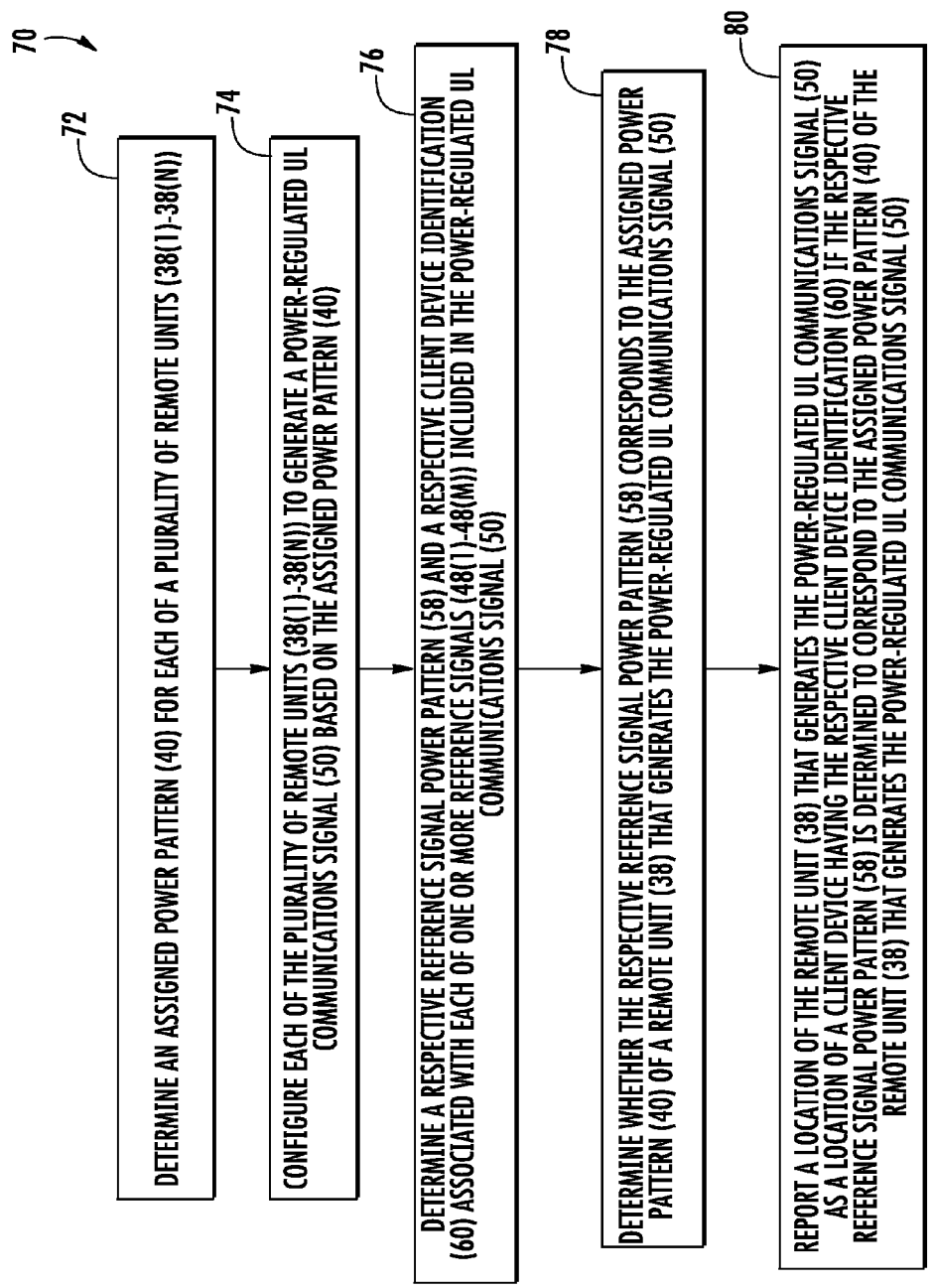
FIG. 3 is a flowchart of an exemplary client device location identification process that can be employed by the client device location identification system of FIG. 2 to determine locations of client devices in the DAS.

FIG. 3 is a flowchart of an exemplary client device location identification process 70 that can be employed by the client device location identification system 30 of FIG. 2 to determine client device locations in the DAS 34 based on detecting the plurality of assigned power patterns 40(1)-40(N) associated with the plurality of remote units 38(1)-38(N).

With reference to FIG. 3, the client device location system 32 in the client device location identification system 30 is configured to determine the assigned power pattern 40 for each of the plurality of remote units 38(1)-38(N) (block 72). The client device location system 32 then configures each of the plurality of remote units 38(1)-38(N) to generate the power-regulated UL communications signal 50 based on the assigned power pattern 40 (block 74). The power-regulated UL communications signal 50 includes the one or more reference signals 48(1)-48(M) that uniquely identify the one or more client devices 36(1)-36(M) communicating with the remote unit 38 that generates the power-regulated UL communications signal 50. Subsequently, the client device location system 32 determines the respective reference signal power pattern 58 and the respective client device identification 60 associated with each of the one or more reference signals 48(1)-48(M) included in the power-regulated UL communications signal 50 (block 76). The client device location system 32 then determines whether the respective reference signal power pattern 58 corresponds to the assigned power pattern 40 of the remote unit 38 that generates the power-regulated UL communications signal 50 (block 78). The client device location system 32 is further configured to report the location of the remote unit 38 that generates the power-regulated UL communications signal 50 as the location of the client device 36 having the respective client device identification 60 if the respective reference signal power pattern 58 is determined to correspond to the assigned power pattern 40 of the remote unit 38 that generates the power-regulated UL communications signal 50 (block 80).

As discussed above with regard to the client device location identification system 30 in FIG. 2, the client device location system 32 determines the locations of the client devices 36 based on the plurality of assigned power patterns 40(1)-40(N) associated with the plurality of remote units 38(1)-38(N). The plurality of assigned power patterns 40(1)-40(N) can either be identical to each other or be distinct from each other. When the plurality of assigned power patterns 40(1)-40(N) is identical to each other, the client device location system 32 needs to make sure the plurality of remote units 38(1)-38(N) generates the plurality of power-regulated UL communications signals 50(1)-50(N) all at a same time.

Figure 4:
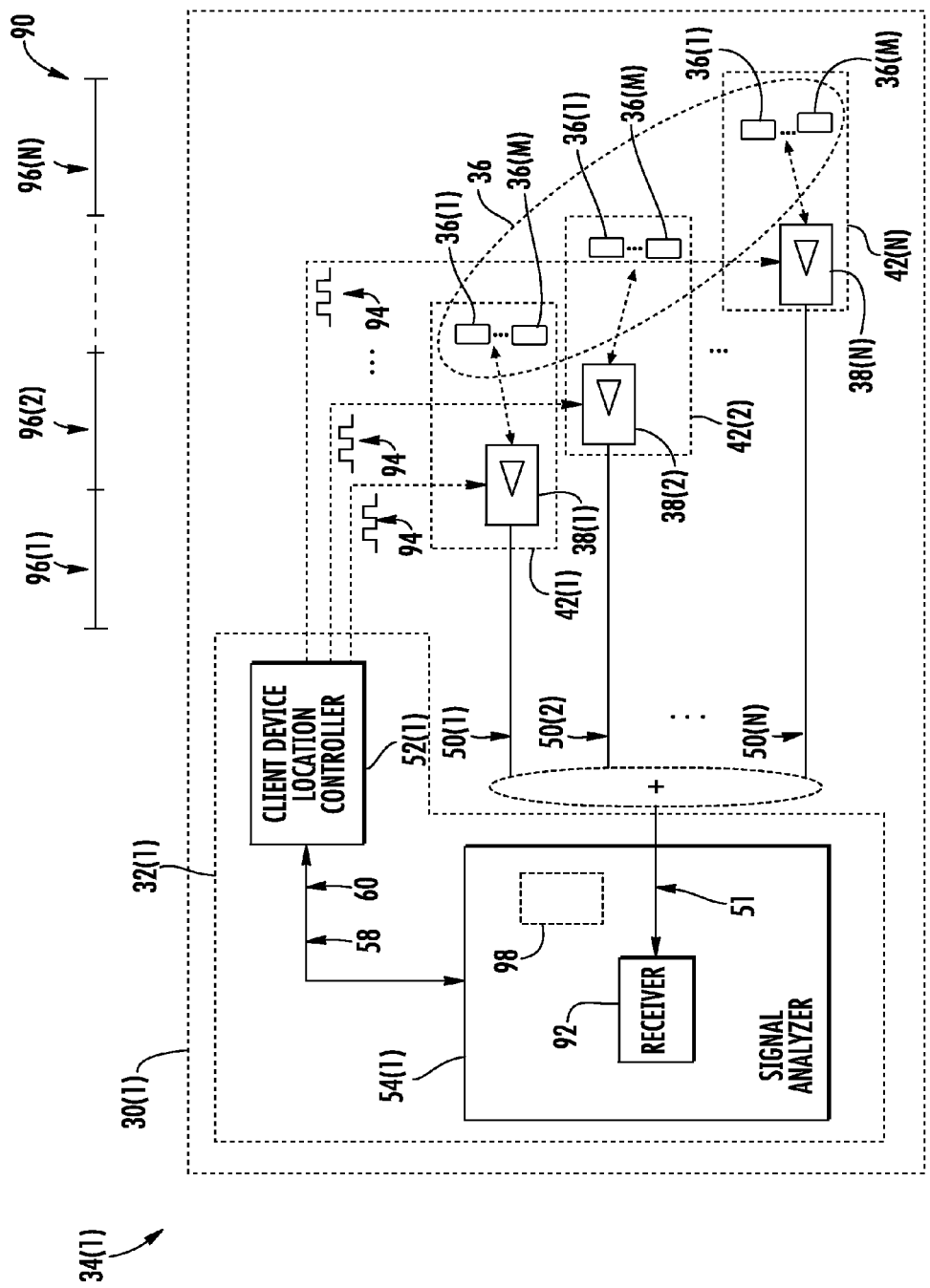
FIG. 4 is a schematic diagram of an exemplary client device location identification system that includes a client device location system configured to determine locations of client devices in a DAS based on a plurality of power-regulated uplink (UL) communications signals respectively generated by the plurality of remote units of FIG. 2 based on a time-division schedule.

In this regard, FIG. 4 is a schematic diagram of an exemplary client device location identification system 30(1) that includes a client device location system 32(1) configured to determine client device locations in a DAS 34(1) based on the plurality of power-regulated UL communications signals 50(1)-50(N) that is respectively generated by the plurality of remote units 38(1)-38(N) based on a time-division schedule 90. Common elements between FIGS. 2 and 4 are shown therein with common element numbers and will not be re-described herein.

With reference to FIG. 4, the client device location identification system 30(1) includes the client device location system 32(1). The client device location system 32(1) includes a client device location controller 52(1) and a signal analyzer 54(1). The signal analyzer 54(1) includes a receiver 92 for receiving the combined power-regulated UL communications signal 51.

The client device location controller 52(1) determines an assigned power pattern 94 for the plurality of remote units 38(1)-38(N), respectively. In this regard, in this example, the assigned power pattern 94 is identical for each of the plurality of remote units 38(1)-38(N). To unambiguously identify each of the plurality of remote units 38(1)-38(N) based on the assigned power pattern 94, the client device location controller 52(1) in this example also determines the time-division schedule 90 for the plurality of remote units 38(1)-38(N). The time-division schedule 90 consists of a plurality of specified periods 96(1)-96(N) that do not overlap one another. In a non-limiting example, each of the plurality of specified periods 96(1)-96(N) may have duration of two hundred (200) milliseconds (ms) (200 ms). According to the time-division schedule 90, the client device location controller 52(1) can configure the plurality of remote units 38(1)-38(N) to generate the plurality of power-regulated UL communications signals 50(1)-50(N) based on the assigned power pattern 94. In a non-limiting example, the client device location controller 52(1) may assign the plurality of specified periods 96(1)-96(N) to the plurality of remote units 38(1)-38(N) according to a round robin scheduling scheme. Alternatively, it may also be possible to configure the signal analyzer 54(1) to receive the plurality of power-regulated UL communications signals 50(1)-50(N) based on the time-division schedule 90. As such, the client device location controller 52(1) can ensure that only one of the plurality of power-regulated UL communications signals 50(1)-50(N) is received and analyzed during each of the plurality of specified periods 96(1)-96(N). The signal analyzer 54(1) may also include a correlation circuit 98 configured to correlate the assigned power pattern 94 with a respective power pattern carried in each of the plurality of power-regulated UL communications signals 50(1)-50(N). Hence, the client device location controller 52(1) can accurately identify the assigned power pattern 94 associated with each of the plurality of remote units 38(1)-38(N) in each of the plurality of specified periods 96(1)-96(N). In a non-limiting example, it may be possible to identify the assigned power pattern 94 associated with each of the plurality of remote units 38(1)-38(N) by detecting and averaging the assigned power pattern 94 in more than one of the plurality of specified periods 96(1)-96(N), thus further improving power pattern detection accuracy.

With continuing reference to FIG. 4, the signal analyzer 54(1) is configured to receive the plurality of power-regulated UL communications signals 50(1)-50(N) from the plurality of remote units 38(1)-38(N), respectively, during the plurality of specified periods 96(1)-96(N). For each power-regulated UL communications signal 50 among the plurality of power-regulated UL communications signals 50(1)-50(N) received during each specified period 96 among the plurality of specified periods 96(1)-96(N), the signal analyzer 54(1) is configured to determine the respective reference signal power pattern 58 and the respective client device identification 60 associated with each of the one or more reference signals 48(1)-48(M) in the power-regulated UL communications signal 50 generated during the specified period 96. In a non-limiting example, the signal analyzer 54(1) subsequently reports the respective reference signal power pattern 58 and the respective client device identification 60 associated with each of the one or more reference signals 48(1)-48(M) in the power-regulated UL communications signal 50 to the client device location controller 52(1). The signal analyzer 54(1) may also report the respective specified period 96 associated with each of the one or more reference signals 48(1)-48(M) in the power-regulated UL communications signal 50 to the client device location controller 52(1).

In response to receiving the respective reference signal power pattern 58 and the respective client device identification 60 associated with the power-regulated UL communications signal 50 generated during the specified period 96 of the time-division schedule 90, the client device location controller 52(1) compares the respective reference signal power pattern 58 against the assigned power pattern 94 of the remote unit 38, which may be any of the plurality of remote units 38(1)-38(N), that generates the power-regulated UL communications signal 50 during the specified period 96. If the respective reference signal power pattern 58 corresponds to the assigned power pattern 94 of the remote unit 38 that generates the power-regulated UL communications signal 50 during the specified period 96, it is an indication that the client device 36 having the respective client device identification 60 is communicating with the remote unit 38 during the specified period 96. Therefore, the client device location controller 52(1) can report the location of the remote unit 38, which generates the power-regulated UL communications signal 50 during the specified period 96 of the time-division schedule 90, as the location of the client device 36 having the respective client device identification 60. For example, if the respective reference signal power pattern 58 corresponds to the assigned power pattern 94 of the remote unit 38(1), and the respective client device identification 60 is associated with the client device 36(1), the client device location controller 52(1) can report the location of the remote unit 38(1) as the location of the client device 36(1). In a non-limiting example, it may be possible that the client device 36(1) has a previous location identified by a location of the remote unit 38(2). In this regard, the client device location controller 52(1) may take into consideration the previous location of the client device 36(1) to improve accuracy of the location identification.

In another non-limiting example, it may also be possible to more precisely locate a client device 36 than by a general location associated with one remote unit 38(1)-38(N). For example, if a client device 36 is located in the remote coverage area of more than one remote unit 38, the client device 36 having the respective client device identification 60 may be associated with one or more reference signals 48(1)-48(M) of the one or more power-regulated UL communications signals 50 among the plurality of power-regulated UL communications signals 50(1)-50(N). In this regard, using client device 36(1) as the example, the client device 36(1) having the respective client device identification 60 may be located in an overlapping coverage area of the more than one remote units 38. This client device 36(1) may be more precisely located if the client device 36(1) can be determined to be associated with the overlapping coverage as opposed to just one remote unit 38.

In this regard, the client device 36(1) may be located inside the overlapping coverage area between remote units 38 among remote units 38(1)-38(N), such as remote units 38 that are adjacent or closely located to each other with overlapping coverage areas. It may also be possible that the client device 36(1) is located closer to one or some remote units 38(1)-38(N) than the others. In this regard, the client device location controller 52(1) may be configured to provide more precise location of the client device 36(1) based on a variety of methods.

In another non-limiting example, the client device location controller 52(1) may be configured to determine the remote unit 38 among remote units 38(1)-38(N) closest to the client device 36(1) by measuring signal strengths (e.g., received signal strength indicator (RSSI)) of the power-regulated UL communications signals 50 received by more than one remote unit 38. This may allow an even more precise determination of the location of the client device 36(1) inside the overlapping coverage area in terms of determining which remote unit 38 is located closer to and/or receiving a stronger power-regulated UL communications signal 50 from the client device 36(1). In this regard, the client device location controller 52(1) may be able to determine a remote unit 38 among the remote units 38(1)-38(N) that is closest to the client device 36(1) if the power-regulated UL communications signals 50 received by a remote unit 38 is stronger as compared to the power-regulated UL communications signals 50 received by other remote units 38. In another non-limiting example, the client device location controller 52(1) may be further configured to determine location of the client device 36(1) by employing a location determination algorithm (e.g., triangulation) to further improve preciseness of the location determination. After determining the one or more associated remote units 38 among the one or more remote units 38(1)-38(N), the client device location controller 52(1) may report the location of the client device 36(1) associated with one or more remote units 38 more precisely.

Figure 5:
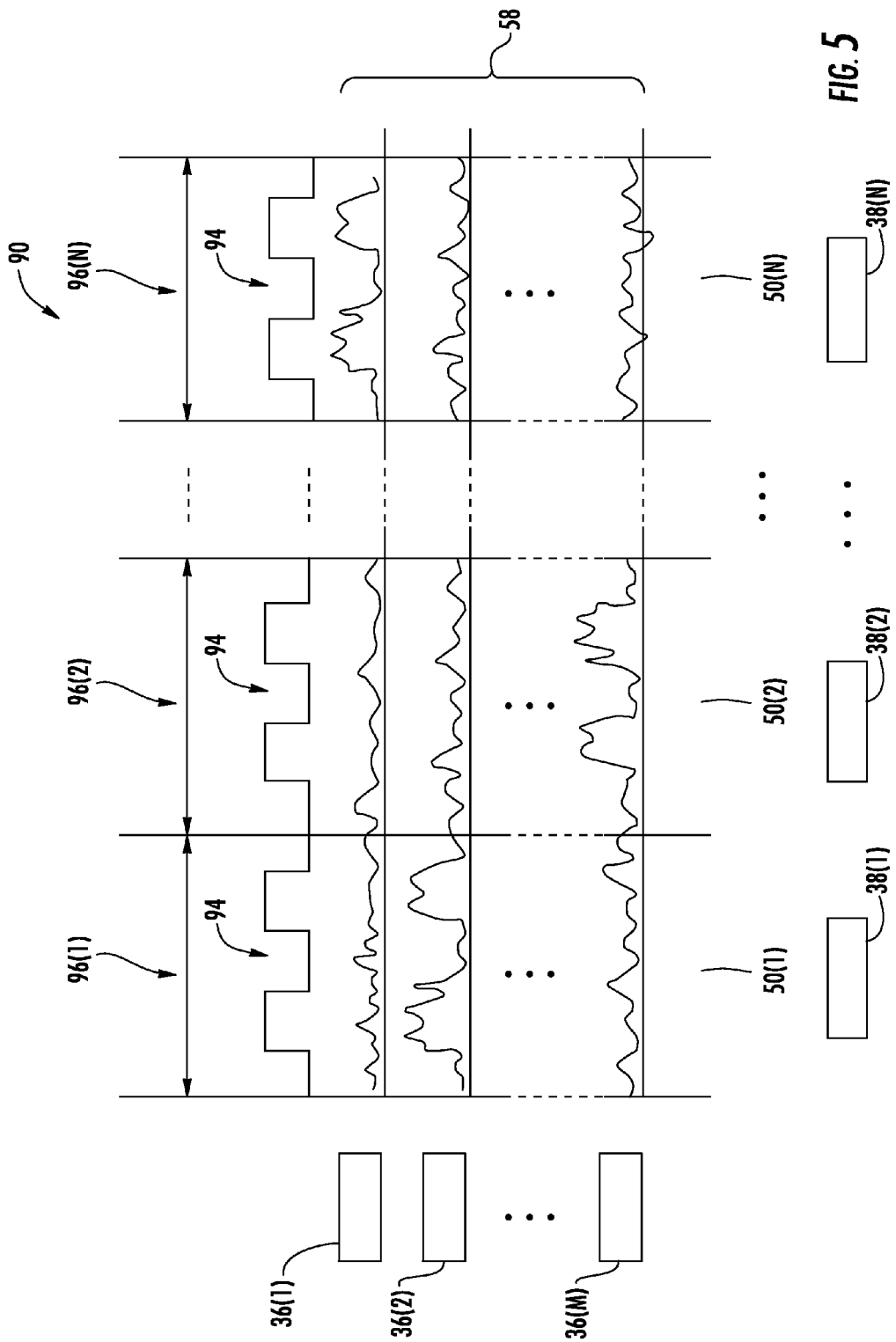
FIG. 5 is a diagram providing an exemplary illustration of the client device location system of FIG. 4 determining the locations of client devices based on the plurality of power-regulated UL communications signals that is respectively generated by the plurality of remote units based on the time-division schedule.

FIG. 5 is a diagram providing an exemplary illustration of the client device location system 32(1) of FIG. 4 determining client device locations based on based on the plurality of power-regulated UL communications signals 50(1)-50(N) that are respectively generated by the plurality of remote units 38(1)-38(N) based on the time-division schedule 90. The plurality of remote units 38(1)-38(N) is configured to generate the plurality of power-regulated UL communications signals 50(1)-50(N) based on the assigned power pattern 94 that is identical during each of the plurality of specified periods 96(1)-96(N) of the time-division schedule 90. During the specified period 96(1), the remote unit 38(1) generates the power-regulated UL communications signal 50(1) based on the assigned power pattern 94. In the power-regulated UL communications signal 50(1), for example, the respective reference signal power pattern 58 associated with the client device 36(2) corresponds to the assigned power pattern 94 of the remote unit 38(1) that generates the power-regulated UL communications signal 50(1). As such, the client device location identification system 30(1) (not shown) can report the location of the remote unit 38(1) as the location of the client device 36(2).

With continuing reference to FIG. 5, during the specified period 96(2), the remote unit 38(2) generates the power-regulated UL communications signal 50(2) based on the assigned power pattern 94. In the power-regulated UL communications signal 50(2), for example, the respective reference signal power pattern 58 associated with the client device 36(M) corresponds to the assigned power pattern 94 of the remote unit 38(2) that generates the power-regulated UL communications signal 50(2). As such, the client device location identification system 30(1) can report the location of the remote unit 38(2) as the location of the client device 36(M). Similarly, during the specified period 96(N), the remote unit 38(N) generates the power-regulated UL communications signal 50(N) based on the assigned power pattern 94. In the power-regulated UL communications signal 50(N), for example, the respective reference signal power pattern 58 associated with the client device 36(1) corresponds to the assigned power pattern 94 of the remote unit 38(N) that generates the power-regulated UL communications signal 50(N). As such, the client device location identification system 30(1) can report the location of the remote unit 38(N) as the location of the client device 36(1).

Figure 6:
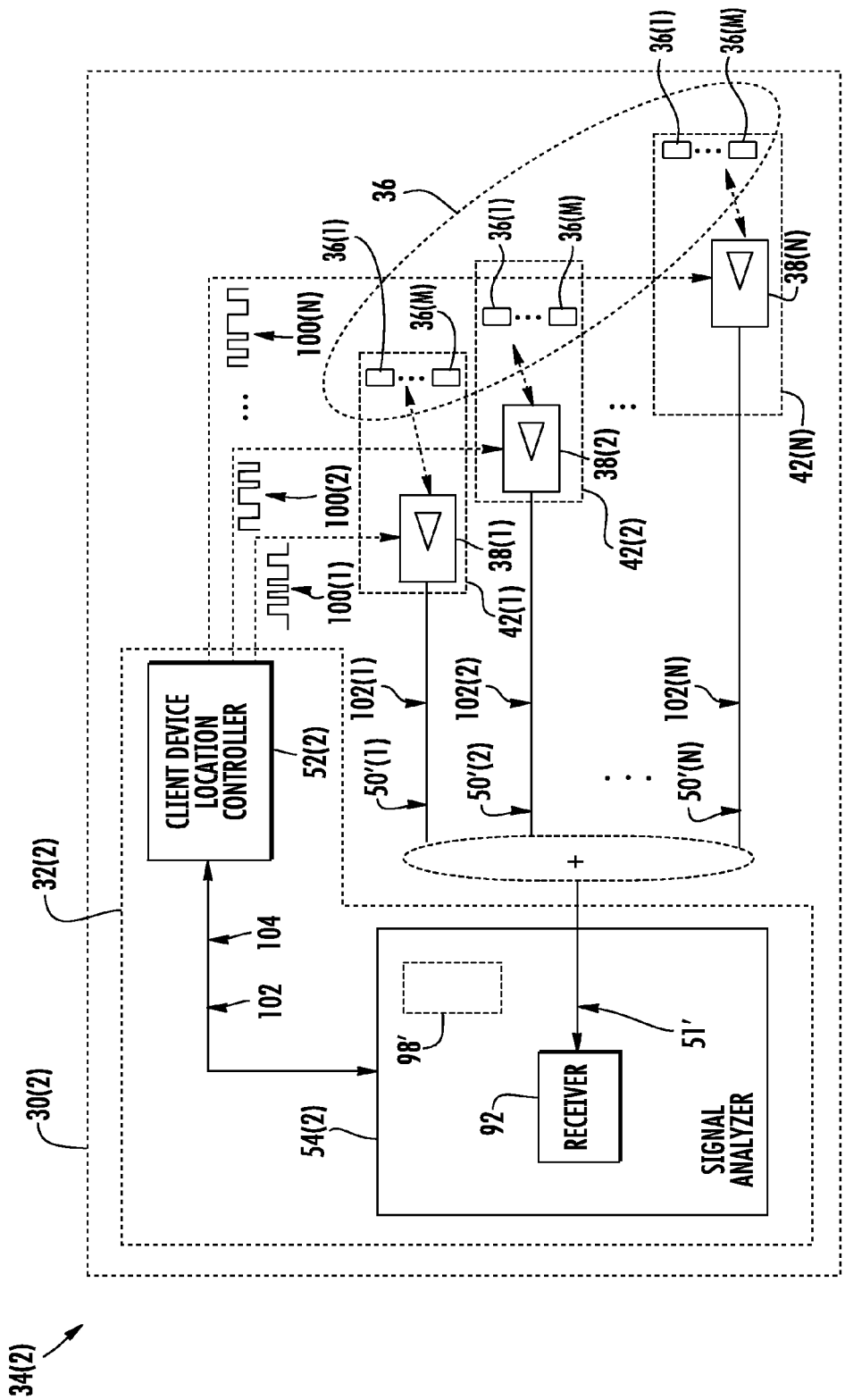
FIG. 6 is a schematic diagram of an exemplary client device location identification system that includes a client device location system configured to determine the locations of client devices in a DAS based on identifying unique power patterns associated with the remote units in power-regulated UL communications signals generated by the plurality of remote units of FIG. 2.

As one alternative to configuring the plurality of remote units 38(1)-38(N) to generate the plurality of power-regulated UL communications signals 50(1)-50(N) based on the time-division schedule 90 in FIG. 4, it is possible to assign unique power patterns to each of the plurality of remote units 38(1)-38(N). In this regard, FIG. 6 is a schematic diagram of an exemplary client device location identification system 30(2) that includes a client device location system 32(2) configured to determine client device locations in a DAS 34(2) based on a plurality of power-regulated UL communications signals 50'(1)-50'(N) respectively generated by the plurality of remote units 38(1)-38(N) according to a plurality of assigned unique power patterns 100(1)-100(N) which is distinct among the plurality of remote units 38(1)-38(N) of FIG. 2. Common elements between FIGS. 2, 4, and 6 are shown therein with common element numbers and will not be re-described herein.

With reference to FIG. 6, the client device location identification system 30(2) includes the client device location system 32(2). The client device location system 32(2) includes a client device location controller 52(2) and a signal analyzer 54(2). The signal analyzer 54(2) includes the receiver 92 that receives the plurality of power-regulated UL communications signals 50'(1)-50'(N) as a combined power-regulated UL communications signal 51'.

The client device location controller 52(2) determines the plurality of assigned unique power patterns 100(1)-100(N) for the plurality of remote units 38(1)-38(N), respectively.

The plurality of assigned unique power patterns 100(1)-100(N) is distinct among each other. Accordingly, the client device location controller 52(2) can configure the plurality of remote units 38(1)-38(N) to concurrently generate the plurality of power-regulated UL communications signals 50'(1)-50'(N) based on the plurality of assigned unique power patterns 100(1)-100(N).

With continuing reference to FIG. 6, the signal analyzer 54(2) is configured to concurrently receive the plurality of power-regulated UL communications signals 50'(1)-50'(N) from the plurality of remote units 38(1)-38(N), respectively. The plurality of power-regulated UL communications signals 50'(1)-50'(N) includes a plurality of respective reference signal power patterns 102(1)-102(N). A correlation circuit 98' correlates the assigned unique power patterns 100(1)-100(N) with the plurality of respective reference signal power patterns 102(1)-102(N) carried in the plurality of power-regulated UL communications signals 50'(1)-50'(N). For each power-regulated UL communications signal 50' among the plurality of power-regulated UL communications signals 50'(1)-50'(N), the signal analyzer 54(2) is configured to determine the respective reference signal power pattern 102 and a respective client device identification 104 associated with each of the one or more reference signals 48(1)-48(M) (not shown) included in the power-regulated UL communications signal 50'. In a non-limiting example, the signal analyzer 54(2) subsequently reports the respective reference signal power pattern 58 and the respective client device identification 60 associated with each of the one or more reference signals 48(1)-48(M) in the power-regulated UL communications signal 50' to the client device location controller 52(2).

In response to receiving the respective reference signal power pattern 102 and the respective client device identification 104 associated with the power-regulated UL communications signal 50', the client device location controller 52(2) compares the respective reference signal power pattern 58 against the assigned unique power pattern 100 of the remote unit 38, which may be any of the plurality of remote units 38(1)-38(N), that generates the power-regulated UL communications signal 50'. If the respective reference signal power pattern 102 corresponds to the assigned unique power pattern 100 of the remote unit 38 that generates the power-regulated UL communications signal 50', it is an indication that the client device 36 having the respective client device identification 104 is communicating with the remote unit 38. Therefore, the client device location controller 52(2) can report the location of the remote unit 38, which generates the power-regulated UL communications signal 50', as the location of the client device 36 having the respective client device identification 104. The client device location controller 52(2) may also report the location of the respective coverage area 42 in which the remote unit 38 is located as the location of the client device 36 having the respective client device identification 104.

Figure 7:
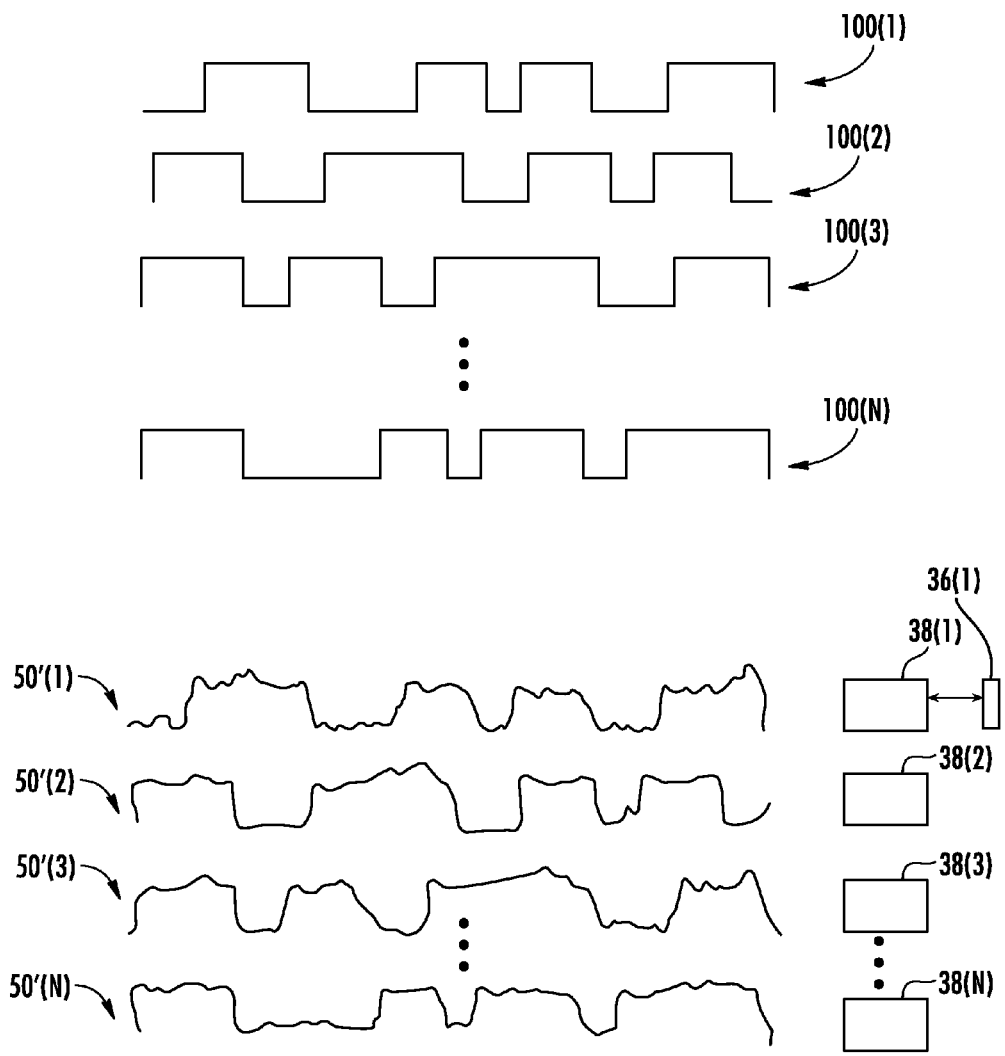
FIG. 7 is a schematic diagram providing an exemplary illustration of the client device location system of FIG. 6 determining locations of client devices based on a plurality of power-regulated UL communications signals that is respectively generated by a plurality of remote units based on a plurality of respective reference signal power patterns.

FIG. 7 is a schematic diagram providing an exemplary illustration of the client device location system 32(2) of FIG. 6 determining locations of client devices based on the plurality of power-regulated UL communications signals 50'(1)-50'(N) that is respectively generated by the plurality of remote units 38(1)-38(N) based on the plurality of respective reference signal power patterns 102(1)-102(N).

With reference to FIG. 7, in the power-regulated UL communications signal 50'(1), for example, the respective reference signal power pattern 102(1) (not shown) associated with the client device 36(1) corresponds to the assigned unique power pattern 100(1) of the remote unit 38(1) that generates the power-regulated UL communications signal 50'(1). As such, the client device location identification system 30(2) (not shown) can report the location of the remote unit 38(1) as the location of the client device 36(1).

Figure 8:
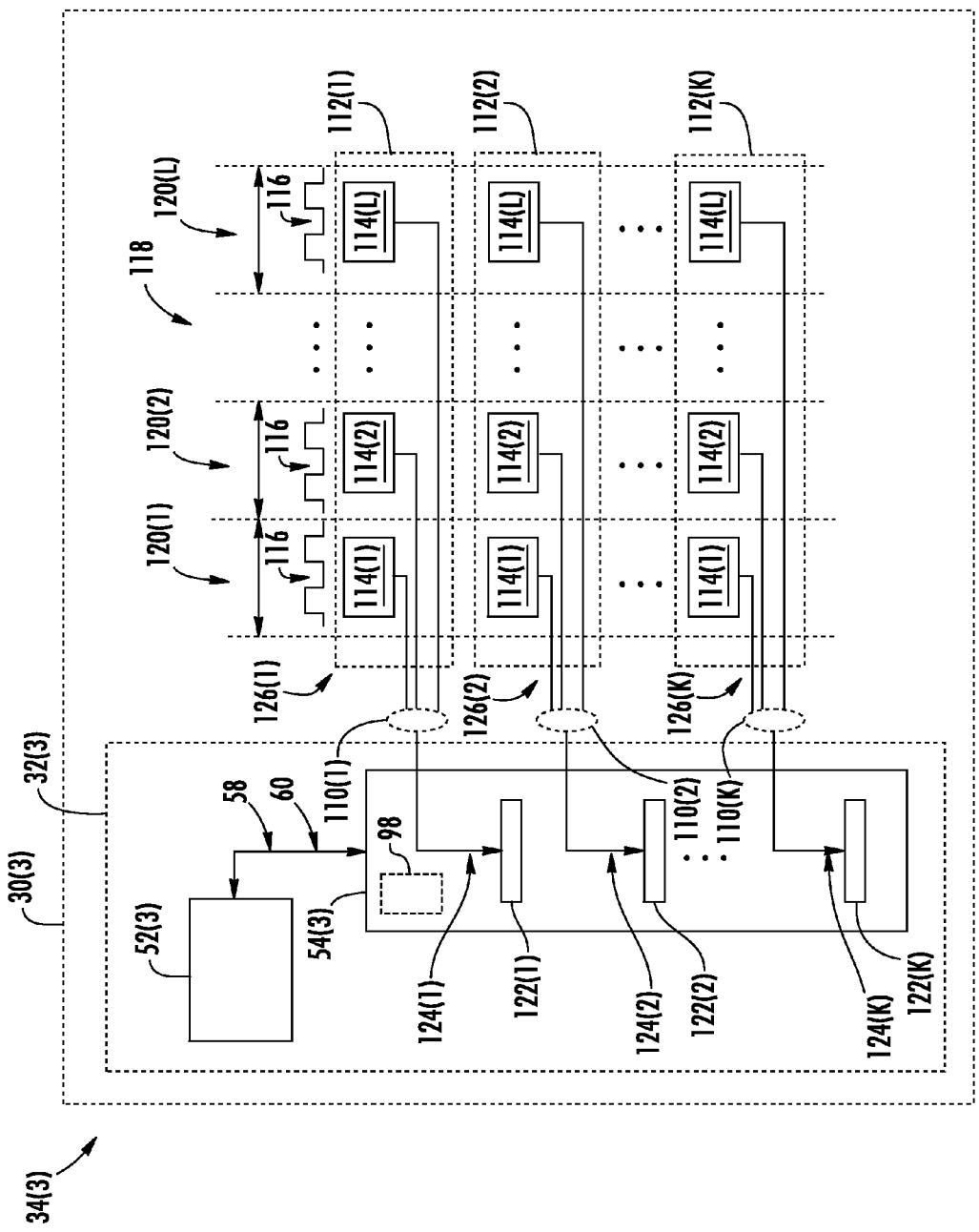
FIG. 8 is a schematic diagram of an exemplary client device location identification system that includes a client device location system configured to determine the locations of client devices in a DAS based on a plurality of power-regulated UL communications signals that is respectively generated by a plurality of remote unit clusters.

As another alternative to employing the time-division schedule 90 for the plurality of remote units 38(1)-38(N) as discussed in reference of FIG. 4, it is also possible to first organize the plurality of remote units 38(1)-38(N) into multiple remote unit clusters and then employ the time-division schedule 90 inside each of the multiple remote unit clusters. In this regard, FIG. 8 is a schematic diagram of an exemplary client device location identification system 30(3) that includes a client device location system 32(3) configured to determine client device locations in a DAS 34(3) based on a plurality of power-regulated UL communications signals 110(1)-110(K) that is respectively generated by a plurality of remote unit clusters 112(1)-112(K). Elements of FIGS. 2, 4, and 6 are referenced in connection with FIG. 7 and will not be re-described herein.

With reference to FIG. 8, each of the plurality of remote unit clusters 112(1)-112(K) may be configured to include one or more remote units 114(1)-114(L). In a non-limiting example, the plurality of remote unit clusters 112(1)-112(K) is a plurality of logical clusters. In this regard, it is possible to logically assign the one or more remote units 114(1)-114(L) to each of the plurality of remote unit clusters 112(1)-112(K) without changing physical locations of the one or more remote units 114(1)-114(L).

The client device location system 32(3) includes a client device location controller 52(3) and a signal analyzer 54(3). The client device location controller 52(3) determines an assigned power pattern 116 for the plurality of remote unit clusters 112(1)-112(K), respectively. Accordingly, the plurality of remote unit clusters 112(1)-112(K) generate the plurality of power-regulated UL communications signals 110(1)-110(K) based on the assigned power pattern 116. Since the assigned power pattern 116 is identical for each of the one or more units 114(1)-114(L) in each of the plurality of remote unit clusters 112(1)-112(K), to be able to unambiguously identify each of the one or more remote units 114(1)-114(L) in each of the plurality of remote unit clusters 112(1)-112(K) based on the assigned power pattern 116, the client device location controller 52(3) also determines a time-division schedule 118 for the one or more remote units 114(1)-114(L) in each of the plurality of remote unit clusters 112(1)-112(K).

The time-division schedule 118 consists of a plurality of specified periods 120(1)-120(L) that do not overlap with each other. In a non-limiting example, each of the plurality of specified periods 120(1)-120(L) may have duration of two hundred milliseconds (200 ms). Based on the time-division schedule 118, the client device location controller 52(3) can configure the one or more remote units 114(1)-114(L) in each of the plurality of remote unit clusters 112(1)-112(K) to generate the power-regulated UL communications signal 110 among the plurality of power-regulated UL communications signals 110(1)-110(K) based on the assigned power pattern 116. In a non-limiting example, the client device location controller 52(3) may assign the plurality of specified periods 120(1)-120(L) to the one or more remote units 114(1)-114(L) in each of the plurality of remote unit clusters 112(1)-112(K) according to round robin scheduling scheme. As such, during each of the plurality of specified periods 120(1)-120(L), only one of the one or more remote units 114(1)-114(L) in each of the plurality of remote unit clusters 112(1)-112(K) is generating the power-regulated UL communications signal 110 among the plurality of power-regulated UL communications signals 110(1)-110(K). Hence, the client device location controller 52(3) can unambiguously identify each of the one or more remote units 114(1)-114(L) in each of the plurality of remote unit clusters 112(1)-112(K) based on the assigned power pattern 116 and the plurality of specified periods 120(1)-120(L).

With continuing reference to FIG. 8, the signal analyzer 54(3) includes a plurality of signal receivers 122(1)-122(K) coupled to the plurality of remote unit clusters 112(1)-112(K) to receive the plurality of power-regulated UL communications signals 110(1)-110(K) as a plurality of combined power-regulated UL communications signals 124(1)-124(K), respectively. As discussed above, during each of the plurality of specified periods 120(1)-120(L), the plurality of combined power-regulated UL communications signals 124(1)-124(K) corresponds to the plurality of power-regulated UL communications signals 110(1)-110(K) that is generated by one of the one or more remote units 114(1)-114(L) in the plurality of remote unit clusters 112(1)-112(K).

The signal analyzer 54(3) is configured to respectively receive the plurality of power-regulated UL communications signals 110(1)-110(K) from the plurality of remote unit clusters 112(1)-112(K) during the plurality of specified periods 120(1)-120(L). The signal analyzer 54(3) is configured to determine the respective reference signal power pattern 58 and the respective client device identification 60 associated with each of the one or more reference signals 48(1)-48(M) (not shown) included in each of the plurality of power-regulated UL communications signals 110(1)-110(K) generated during each of the plurality of specified periods 120(1)-120(L). In a non-limiting example, the signal analyzer 54(3) subsequently reports the respective reference signal power pattern 58 and the respective client device identification 60 associated with each of the one or more reference signals 48(1)-48(M) in each of the plurality of power-regulated UL communications signals 110(1)-110(K) during each of the plurality of specified periods 120(1)-120(L) to the client device location controller 52(3).

In a non-limiting example, it may be possible to identify the assigned power pattern 94 associated with each of the plurality of remote unit clusters 112(1)-112(K) by detecting and averaging the assigned power pattern 116 in more than one of the plurality of specified periods 120(1)-120(L), thus further improving power pattern detection accuracy. In another non-limiting example, it may be possible to assign a plurality of assigned unique power patterns 126(1)-126(K) to the plurality of remote unit clusters 112(1)-112(K), respectively. During each of the plurality of specified periods 120(1)-120(L), only one of the one or more remote units 114(1)-114(L) in each of the plurality of remote unit clusters 112(1)-112(K) is generating the power-regulated UL communications signal 110 among the plurality of power-regulated UL communications signals 110(1)-110(K). By assigning the plurality of assigned unique power patterns 126(1)-126(K) to the plurality of remote unit clusters 112(1)-112(K), respectively, it may be possible to increase the probability of accurately identifying each of the plurality of remote unit clusters 112(1)-112(K).

In response to receiving the respective reference signal power pattern 58 and the respective client device identification 60 associated with a power-regulated UL communications signal 110 among the plurality of power-regulated UL communications signals 110(1)-110(K) during a specified period 120 among the plurality of specified periods 120(1)-120(L), the client device location controller 52(3) compares the respective reference signal power pattern 58 against the assigned power pattern 116 of the remote unit 114, which may be any of the one or more remote units 114(1)-114(L), that generates the power-regulated UL communications signal 110 during the specified period 120. If the respective reference signal power pattern 58 corresponds to the assigned power pattern 116 of the remote unit 114 that generates the power-regulated UL communications signal 110 during the specified period 120, it is an indication that the client device 36 having the respective client device identification 60 is communicating with the remote unit 114 during the specified period 120. Therefore, the client device location controller 52(3) can report the location of the remote unit 114, which generates the power-regulated UL communications signal 110 during the specified period 120, as the location of the client device 36 having the respective client device identification 60.

Figure 9:
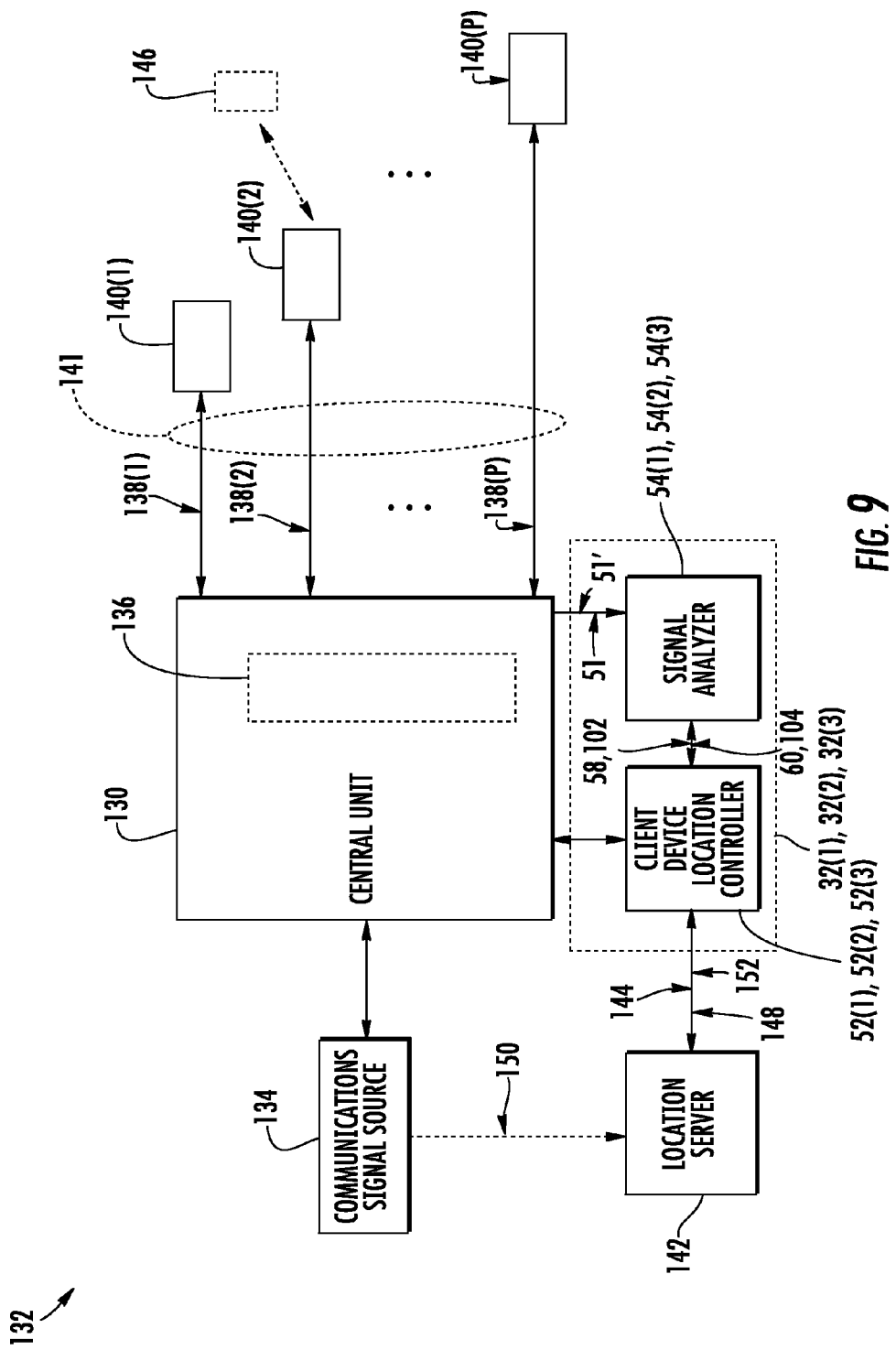
FIG. 9 is a schematic diagram of an exemplary central unit coupled to the client device location system of FIG. 4, the client device location system of FIG. 6, or the client device location system of FIG. 8 to determine locations of client devices in a DAS.

The client device location system 32(1) of FIG. 4, the client device location system 32(2) of FIG. 6, and the client device location system 32(3) of FIG. 8 may be coupled to a central unit of a DAS. In this regard, FIG. 9 is a schematic diagram of an exemplary central unit 130 coupled to the client device location system 32(1) of FIG. 4, the client device location system 32(2) of FIG. 6, or the client device location system 32(3) of FIG. 8 to determine client device locations in a DAS 132. Common elements between FIGS. 4, 6, 8, and 9 are shown therein with common element numbers and will not be re-described herein.

With reference to FIG. 9, in a non-limiting example, the DAS 132 may be a wireless distribution system (WDS) deployed in a star or a daisy chain topology and the central unit 130 may be provided as a head-end equipment (HEE). The central unit 130 is communicatively coupled to a communications signal source 134. In a non-limiting example, the communications signal source 134 may be a base transceiver station (BTS), a baseband unit (BBU), a virtual base station (vBS), or a centralized/clouding radio access network (C-RAN). In another non-limiting example, the signal analyzer 54(1), the signal analyzer 54(2), or the signal analyzer 54(3) may be provided in the central unit 130. In another non-limiting example, the central unit 130 may include a signal coupler 136. The signal coupler 136 is configured to receive a plurality of power regulated UL communications signals 138(1)-138(P) from a plurality of remote units 140(1)-140(P), respectively. The central unit 130 is coupled to the plurality of remote units 140(1)-140(P) via at least one communications medium 141. In a non-limiting example, the DAS 132 may be an optical fiber-based DAS and the at least one communications medium 141 is at least one optical fiber-based communications medium. The signal coupler 136 provides the plurality of power regulated UL communications signals 138(1)-138(P) to the central unit 130. The central unit 130 provides the plurality of power regulated UL communications signals 138(1)-138(P) to the signal analyzer 54(1), the signal analyzer 54(2), and the signal analyzer 54(3).

With continuing reference to FIG. 9, the client device location system 32(1), the client device location system 32(2), and the client device location system 32(3) may be respectively coupled to a location server 142. In a first non-limiting example, the location server 142 may initiate a request 144 to locate a specified client device(s) 146 associated with specified reference signal(s) (not shown). Alternatively, in a second non-limiting example, the location server 142 may initiate a request 148 to locate the specified client device(s) 146 associated with specified client device identification(s) (not shown). In another non-limiting example, the location server 142 may initiate the request 144 or the request 148 in response to receiving a location service request 150 from the communications signal source 134. For example, the communications signal source 134 may generate the location service request 150 in response to receiving an enhanced-911 (E911) call from the specified client device(s) 146. In another non-limiting example, the location server 142 may be configured to automatically update locations of the specified client device(s) 146 in the DAS 132 according to a specified schedule. In response to receiving the request 144 or the request 148 from the location server 142, the client device location systems 32(1), 32(2), and 32(3) may provide a location report 152 to indicate location(s) of the remote unit(s), for example the remote unit 140(2), with which the specified client device(s) 146 is communicating.

In this regard, FIG. 10A is a schematic diagram providing an exemplary illustration of the location server 142 of FIG. 9 configured to locate the specified client device(s) 146 associated with the specified reference signal(s). Elements of FIG. 9 are referenced in connection with FIG. 10A and will not be re-described herein.

With reference to FIG. 10A, in a non-limiting example, if the specified client device(s) 146 (not shown) is an LTE client device, the location server 142 may indicate in the request 144 to locate the specified client device(s) 146 (not shown) associated with specified DRS(s) (not shown) and/or SRS(s) (not shown) in specified physical resource blocks (PRBs) (not shown). In another non-limiting example, the location server 142 may request the communications signal source 134 (not shown) to instruct the specified client device(s) 146 to transmit the specified SRS(s) when the specified client device(s) 146 is in idle mode operation. In another non-limiting example, the specified reference signal(s) (not shown) for locating the specified client device(s) 146 may be provided by the communications signal source 134 in the location service request 150 (not shown) and forwarded to the client device location systems 32(1), 32(2), and 32(3) along with the request 144. In response to receiving the request 144, the client device location systems 32(1), 32(2), and 32(3) locate the specified client device(s) 146 based on the specified reference signal(s) and provide the location report 152 to indicate the location(s) of the specified client device(s) 146.

FIG. 10B is a schematic diagram providing an exemplary illustration of the location server 142 of FIG. 9 configured to locate the specified client device(s) 146 (not shown) associated with the specified client device identification(s) (not shown). Elements of FIG. 9 are referenced in connection with FIG. 10B and will not be re-described herein.

With reference to FIG. 10B, in a non-limiting example, the location server 142 may indicate in the request 148 to locate the specified client device(s) 146 associated with specified client device identification(s). In a non-limiting example, the specified client device identification(s) may be cell radio network temporary identifier (C-RNTI), international mobile subscriber identity (IMSI), and so on.

According to previous discussions with references to FIGS. 4, 6, and 8, the client device location systems 32(1), 32(2), and 32(3) can only locate the specified client device(s) 146 based on the respective reference signal power pattern 58 (not shown). As such, the client device location systems 32(1), 32(2), and 32(3) must determine the specified reference signal(s) (not shown) corresponding to the specified client device identification(s). In a non-limiting example, the client device location systems 32(1), 32(2), and 32(3) may obtain the specified reference signal(s) corresponding to the specified client device identification(s) by analyzing the downlink control information (DCI). After determining the specified reference signal(s) corresponding to the specified client device identification(s), the client device location systems 32(1), 32(2), and 32(3) locate the specified client device(s) 146 based on the specified reference signal(s) and the specified client device identification(s) to provide the location report 152 indicating the location(s) of the specified client device(s) 146.

Figure 11:
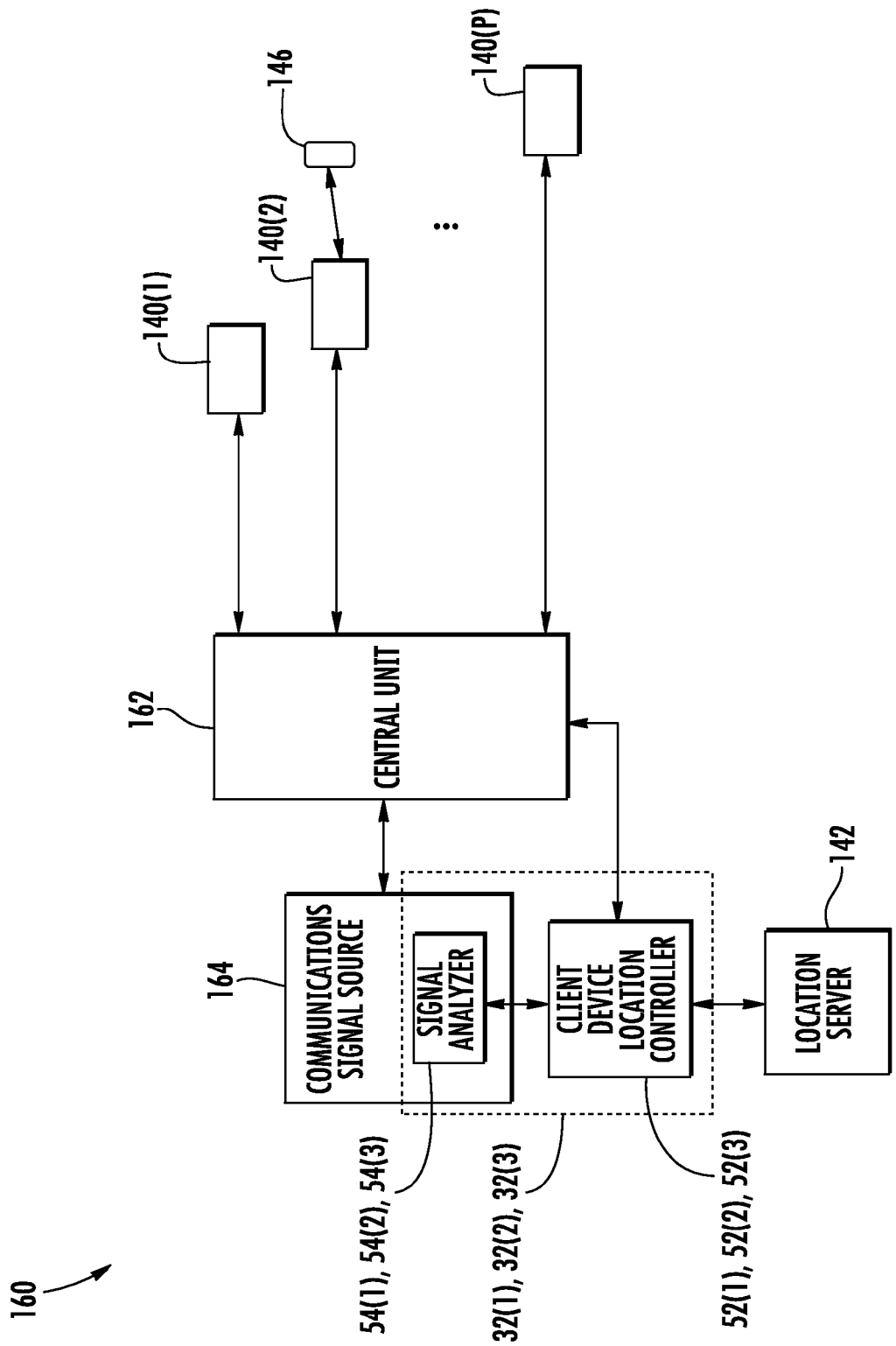
FIG. 11 is a schematic diagram of an exemplary DAS in which the client device location system of FIG. 4, the client device location system of FIG. 6, or the client device location system of FIG. 8 is coupled to both a central unit and a communications signal source to determine locations of client devices in the DAS.

With reference back to FIG. 9, the client device location system 32(1) of FIG. 4, the client device location system 32(2) of FIG. 6, and the client device location system 32(3) of FIG. 8 may also be coupled to both the central unit 130 and the communications signal source 134. In this regard, FIG. 11 is a schematic diagram of an exemplary DAS 160 in which the client device location system 32(1) of FIG. 4, the client device location system 32(2) of FIG. 6, or the client device location system 32(3) of FIG. 8 is coupled to both a central unit 162 and a communications signal source 164 to determine client device locations in the DAS 160. Common elements between FIGS. 9 and 11 are shown therein with common element numbers and will not be re-described herein.

Figure 12:
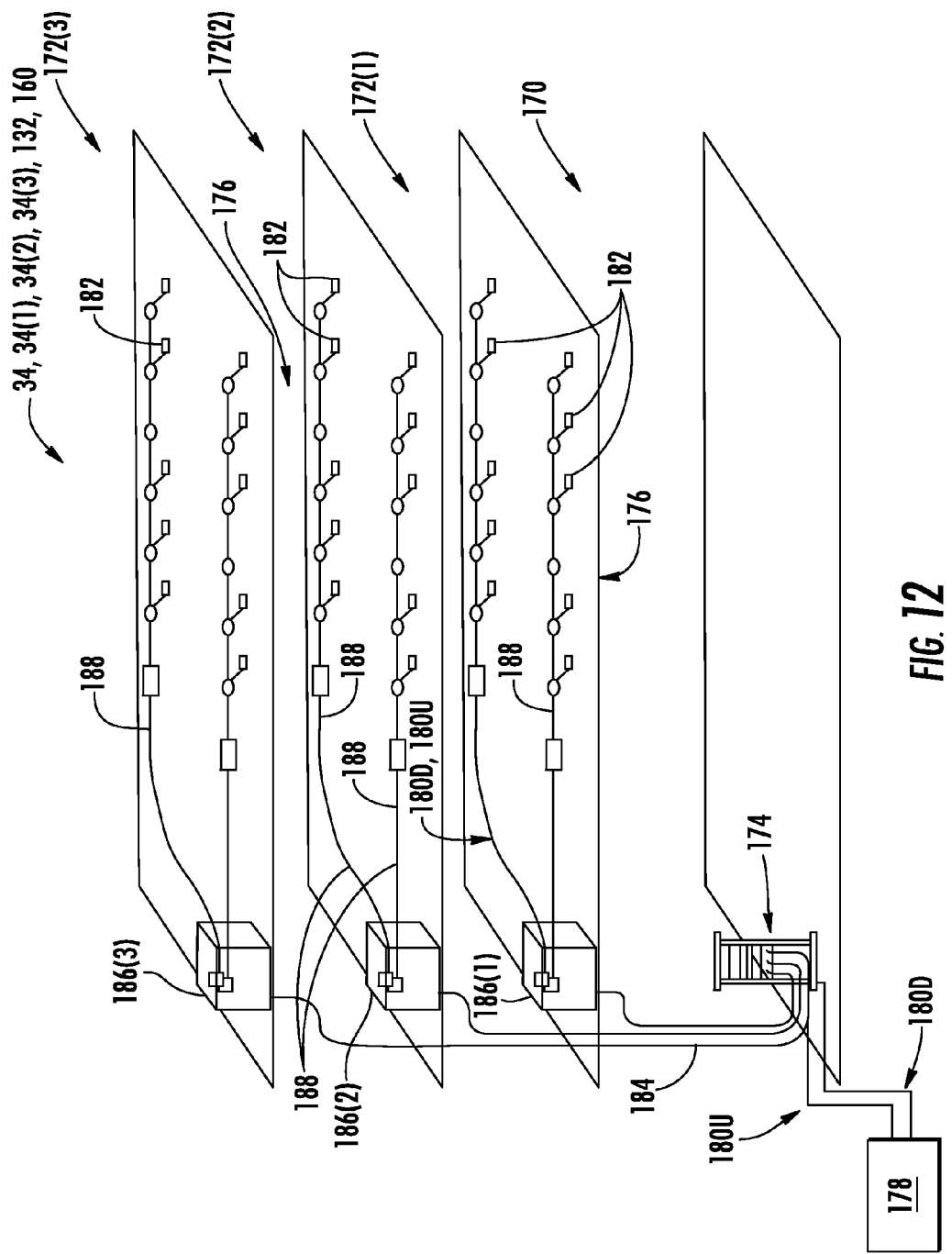
FIG. 12 is a partial schematic cut-away diagram of an exemplary building infrastructure in which the DASs of FIGS. 2, 4, 6, 8, 9, and 11 employing the client device location identifications systems can be employed.

As illustrated in FIG. 11, the signal analyzer 54(1) of the client device location system 32(1), the signal analyzer 54(2) of the client device location system 32(2), or the signal analyzer 54(3) of the client device location system 32(3) may also be provided in the communications signal source 164. The client device location system 32 of FIG. 2, the client device location system 32(1) of FIG. 4, the client device location system 32(2) of FIG. 6, or the client device location system 32(3) of FIG. 8, which may be provided in the DAS 34 of FIG. 2, the DAS 34(1) of FIG. 4, the DAS 34(2) of FIG. 6, the DAS 34(3) of FIG. 8, the DAS 132 of FIG. 9, and the DAS 160 of FIG. 11, may be provided in an indoor environment, as illustrated in FIG. 12. FIG. 12 is a partial schematic cut-away diagram of an exemplary building infrastructure 170 in which the DAS 34 of FIG. 2, the DAS 34(1) of FIG. 4, the DAS 34(2) of FIG. 6, the DAS 34(3) of FIG. 8, the DAS 132 of FIG. 9, and the DAS 160 of FIG. 11 can be employed. The building infrastructure 170 in this embodiment includes a first (ground) floor 172(1), a second floor 172(2), and a third floor 172(3). The floors 172(1)-172(3) are serviced by a central unit 174 to provide antenna coverage areas 176 in the building infrastructure 170. The central unit 174 is communicatively coupled to a base station 178 to receive downlink communications signals 180D from the base station 178. The central unit 174 is communicatively coupled to a plurality of remote units 182 to distribute the downlink communications signals 180D to the plurality of remote units 182 and to receive uplink communications signals 180U from the plurality of remote units 182, as previously discussed above. The downlink communications signals 180D and the uplink communications signals 180U communicated between the central unit 174 and the plurality of remote units 182 are carried over a riser cable 184. The riser cable 184 may be routed through interconnect units (ICUs) 186(1)-186(3) dedicated to each of the floors 172(1)-172(3) that route the downlink communications signals 180D and the uplink communications signals 180U to the plurality of remote units 182 and also provide power to the plurality of remote units 182 via array cables 188.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A wireless communication system for locating client devices, comprising:
    a central unit communicatively coupled to a communications signal source and a plurality of remote units over at least one communications medium, wherein each of the plurality of remote units is configured to:
        receive a downlink (DL) communications signal from the central unit over the at least one communications medium;
        distribute the DL communications signal to one or more client devices in the wireless communication system;
        receive an uplink (UL) communications signal from the one or more client devices;
        generate a power-regulated UL communications signal based on an assigned power pattern, the power-regulated UL communications signal comprising one or more reference signals uniquely identifying the one or more client devices; and
        provide the power-regulated UL communications signal to the central unit over the at least one communications medium; and
    a client device location system communicatively coupled to the central unit and the plurality of remote units, the client device location system configured to:
        determine the assigned power pattern for each of the plurality of remote units;
        receive the power-regulated UL communications signal from each of the plurality of remote units;
        determine a respective reference signal power pattern and a respective client device identification associated with each of the one or more reference signals comprised in the received power-regulated UL communications signal;
        determine whether the respective reference signal power pattern corresponds to the assigned power pattern of a remote unit that generates the power-regulated UL communications signal; and
        report a location of the remote unit that generates the power-regulated UL communications signal as a location of a client device having the respective client device identification if the respective reference signal power pattern is determined to correspond to the assigned power pattern of the remote unit that generates the power-regulated UL communications signal.

2. The wireless communication system of claim 1, wherein the client device location system is further configured to determine the assigned power pattern for one or more radio frequency (RF) channels associated with each of the plurality of remote units.

3. The wireless communication system of claim 1, wherein the client device location system is further configured to report a predefined location surrounding the remote unit that generates the power-regulated UL communications signal as the location of the client device having the respective client device identification if the respective reference signal power pattern is determined to correspond to the assigned power pattern of the remote unit that generates the power-regulated UL communications signal.

4. The wireless communication system of claim 1, wherein the client device location system comprises:
    a signal analyzer configured to determine the respective reference signal power pattern and the respective client device identification associated with each of the one or more reference signals comprised in the received power-regulated UL communications signal; and
    a client device location controller configured to:
        determine the assigned power pattern for each of the plurality of remote units;
        determine whether the respective reference signal power pattern corresponds to the assigned power pattern of the remote unit that generates the power-regulated UL communications signal; and
        report the location of the remote unit or a predefined location surrounding the remote unit that generates the power-regulated UL communications signal as the location of the client device having the respective client device identification if the respective reference signal power pattern is determined to correspond to the assigned power pattern of the remote unit that generates the power-regulated UL communications signal.

5. The wireless communication system of claim 4, wherein the signal analyzer comprises a receiver configured to receive a combined power-regulated UL communications signal comprising a plurality of power-regulated UL communications signals received from each of the plurality of remote units.

6. The wireless communication system of claim 1, wherein:
    in response to the respective client device identification being associated with the one or more reference signals comprised in more than one power-regulated UL communications signal received from more than one remote unit among the plurality of remote units,
    the client device location system further configured to:
        determine a location of the remote unit among the more than one remote unit; and report the location of the determined remote unit as a location of the client device having the respective client device identification.

7. The wireless communication system of claim 6, wherein the client device location system is further configured to determine the location of the remote unit among the more than one remote unit generating the more than one power-regulated UL communications signals based on the determining the location of the remote unit closest to a previous determine location of the client device.

8. The wireless communication system of claim 6, wherein the client device location system is further configured to:
determine an overlapping coverage area among the more than one remote unit generating the more than one power-regulated UL communications signals based on determining the more than one remote unit receiving power-regulated UL communications signal from the client device; and
determine the location of the remote unit among the more than one remote unit generating the more than one power-regulated UL communications signals based on determining the location of the remote unit among the more than one remote unit receiving a stronger power-regulated UL communications signal from the client device.

9. The wireless communication system of claim 1, wherein the client device location system is further configured to:
determine a time-division schedule comprising a plurality of specified periods;
configure each of the plurality of remote units to generate the power-regulated UL communications signal based on the assigned power pattern and the time-division schedule;
receive the power-regulated UL communications signal from one of the plurality of remote units during each of the plurality of specified periods; and
determine the respective reference signal power pattern and the respective client device identification associated with each of the one or more reference signals comprised in the received power-regulated UL communications signal generated during the specified period.

10. The wireless communication system of claim 1, wherein the client device location system is further configured to:
assign each of the plurality of remote units a unique power pattern to generate the power-regulated UL communications signal based on the assigned unique power pattern;
receive the power-regulated UL communications signal from each of the plurality of remote units; and
determine the respective reference signal power pattern and the respective client device identification associated with each of the one or more reference signals comprised in the received power-regulated UL communications signal.

11. The wireless communication system of claim 1, wherein:
the plurality of remote units is organized into a plurality of remote unit clusters, each of the plurality of remote unit clusters comprising one or more remote units among the plurality of remote units; and
the client device location system is further configured to:
determine a time-division schedule comprising a plurality of specified periods for the one or more remote units comprised in each of the plurality of remote unit clusters;
configure the one or more remote units in each of the plurality of remote unit clusters to generate the power-regulated UL communications signal based on the assigned power pattern and the time-division schedule;
receive a plurality of power-regulated UL communications signals from the plurality of remote unit clusters, respectively, during each of the plurality of specified periods;
determine the respective reference signal power pattern and the respective client device identification associated with each of the one or more reference signals comprised in each of the plurality of power-regulated UL communications signals during the specified period; and
determine whether the respective reference signal power pattern corresponds to the assigned power pattern of the remote unit that generates the power-regulated UL communications signal during the specified period; and
report the location of the remote unit or a predefined location surrounding the remote unit that generates the power-regulated UL communications signal during the specified period as the location of the client device having the respective client device identification if the respective reference signal power pattern is determined to correspond to the assigned power pattern of the remote unit that generates the power-regulated UL communications signal during the specified period.

12. The wireless communication system of claim 4, wherein the client device location system comprises:
a signal analyzer configured to determine the respective reference signal power pattern and the respective client device identification associated with each of the one or more reference signals comprised in the received power-regulated UL communications signal during the specified period; and
a client device location controller configured to:
determine the time-division schedule comprising the plurality of specified periods for the one or more remote units comprised in each of the plurality of remote unit clusters;
configure the one or more remote units in each of the plurality of remote unit clusters to generate the power-regulated UL communications signal based on the assigned power pattern and the time-division schedule;
determine whether the respective reference signal power pattern corresponds to the assigned power pattern of the remote unit that generates the power-regulated UL communications signal during the specified period; and
report the location of the remote unit or the predefined location surrounding the remote unit that generates the power-regulated UL communications signal during the specified period as the location of the client device having the respective client device identification if the respective reference signal power pattern is determined to correspond to the assigned power pattern of the remote unit that generates the power-regulated UL communications signal during the specified period.

13. The wireless communication system of claim 1, wherein:
 each of the plurality of remote units configured to generate a power-regulated long-term evolution (LTE) UL communications signal based on the assigned power pattern, the power-regulated LTE UL communications signal comprising one or more Sounding Reference Signals (SRSs) uniquely identifying the one or more client devices; and
 the client device location system further configured to:
  determine the assigned power pattern for each of the plurality of remote units;
  receive the power-regulated LTE UL communications signal from each of the plurality of remote units;
  determine a respective SRS power pattern and a respective client device identification associated with each of the one or more SRSs comprised in the received power-regulated LTE UL communications signal;
  determine whether the respective SRS power pattern corresponds to the assigned power pattern of the remote unit that generates the power-regulated LTE UL communications signal; and
  report the location of the remote unit or a predefined location surrounding the remote unit that generates the power-regulated LTE UL communications signal as the location of the client device having the respective client device identification if the respective SRS power pattern is determined to correspond to the assigned power pattern of the remote unit that generates the power-regulated LTE UL communications signal.

14. The wireless communication system of claim 1, wherein the plurality of remote units each comprises a variable gain power amplifier configured to generate the power-regulated UL communications signal based on the assigned power pattern.

15. The wireless communication system of claim 1, wherein the client device location system is further configured to:
 receive a request from a location server for locating a specified client device associated with a specified reference signal;
 receive the power-regulated UL communications signal from each of the plurality of remote units;
 determine the respective reference signal power pattern and the respective client device identification associated with the specified reference signal in the received power-regulated UL communications signal;
 determine whether the respective reference signal power pattern corresponds to the assigned power pattern of the remote unit that generates the power-regulated UL communications signal; and
 report the location of the remote unit or a predefined location surrounding the remote unit that generates the power-regulated UL communications signal as the location of the specified client device if the respective reference signal power pattern is determined to correspond to the assigned power pattern of the remote unit that generates the power-regulated UL communications signal.

16. The wireless communication system of claim 1, wherein the client device location system is further configured to:
 receive a request from a location server for locating a specified client device associated a specified client device identification;
 receive the power-regulated UL communications signal from each of the plurality of remote units;
 determine the respective reference signal power pattern and the specified client device identification associated with each of the one or more reference signals comprised in the received power-regulated UL communications signal;
 determine whether the respective reference signal power pattern corresponds to the assigned power pattern of the remote unit that generates the power-regulated UL communications signal; and
 report the location of the remote unit or a predefined location surrounding the remote unit that generates the power-regulated UL communications signal as the location of the specified client device if the respective reference signal power pattern is determined to correspond to the assigned power pattern of the remote unit that generates the power-regulated UL communications signal.

17. A wireless communication system for locating client devices, comprising:
 a plurality of remote units optically connected over at least one optical fiber communications medium and distributed over multiple floors of a building infrastructure, wherein each of the plurality of remote units is configured to:
  receive an optical downlink (DL) communications signal over the at least one optical fiber communications medium;
  distribute the DL communications signal to one or more client devices in the wireless communication system;
  receive an uplink (UL) communications signal from the one or more client devices;
  generate a power-regulated UL communications signal based on an assigned power pattern, the power-regulated UL communications signal comprising one or more reference signals uniquely identifying the one or more client devices; and
  provide the power-regulated UL communications signal over the at least one optical fiber communications medium; and
 a client device location system communicatively coupled to the plurality of remote units, the client device location system configured to:
  determine the assigned power pattern for each of the plurality of remote units;
  receive the power-regulated UL communications signal from each of the plurality of remote units;
  determine a respective reference signal power pattern and a respective client device identification associated with each of the one or more reference signals comprised in the received power-regulated UL communications signal;
  determine whether the respective reference signal power pattern corresponds to the assigned power pattern of a remote unit that generates the power-regulated UL communications signal; and
  report a location of the remote unit that generates the power-regulated UL communications signal as a location of a client device having the respective client device identification if the respective reference signal power pattern is determined to correspond to the assigned power pattern of the remote unit that generates the power-regulated UL communications signal.

18. The wireless communication system of claim 17, wherein:
   in response to the respective client device identification being associated with the one or more reference signals comprised in more than one power-regulated UL communications signal received from more than one remote unit among the plurality of remote units,
   the client device location system further configured to:
      determine a location of the remote unit among the more than one remote unit; and
      report the location of the determined remote unit as a location of the client device having the respective client device identification.

19. The wireless communication system of claim 17, wherein the client device location system is further configured to:
   determine an overlapping coverage area among the more than one remote unit generating the more than one power-regulated UL communications signals based on determining the more than one remote unit receiving power-regulated UL communications signal from the client device; and
   determine the location of the remote unit among the more than one remote unit generating the more than one power-regulated UL communications signals based on determining the location of the remote unit among the more than one remote unit receiving a stronger power-regulated UL communications signal from the client device.

20. The wireless communication system of claim 17, wherein the client device location system is further configured to report a predefined location surrounding the remote unit that generates the power-regulated UL communications signal as the location of the client device having the respective client device identification if the respective reference signal power pattern is determined to correspond to the assigned power pattern of the remote unit that generates the power-regulated UL communications signal.

* * * * *